(12) United States Patent
Jo et al.

(10) Patent No.: US 12,132,227 B2
(45) Date of Patent: Oct. 29, 2024

(54) BATTERY, AND BATTERY PACK AND VEHICLE COMPRISING THE SAME

(71) Applicant: LG ENERGY SOLUTION, LTD., Seoul (KR)

(72) Inventors: Min-Ki Jo, Daejeon (KR); Bo-Hyun Kang, Daejeon (KR); Do-Gyun Kim, Daejeon (KR); Geon-Woo Min, Daejeon (KR); Su-Ji Choi, Daejeon (KR); Kwang-Su Hwangbo, Daejeon (KR); Hae-Jin Lim, Daejeon (KR); Jin-Hak Kong, Daejeon (KR); Soon-O Lee, Daejeon (KR); Kyu-Hyun Choi, Daejeon (KR); Jae-Won Lim, Daejeon (KR); Hak-Kyun Kim, Daejeon (KR); Je-Jun Lee, Daejeon (KR); Ji-Min Jung, Daejeon (KR); Jae-Woong Kim, Daejeon (KR); Jong-Sik Park, Daejeon (KR); Yu-Sung Choe, Daejeon (KR); Byoung-Gu Lee, Daejeon (KR); Duk-Hyun Ryu, Daejeon (KR); Kwan-Hee Lee, Daejeon (KR); Jae-Eun Lee, Daejeon (KR); Pil-Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/132,085

(22) Filed: Apr. 7, 2023

(65) Prior Publication Data

US 2023/0246302 A1    Aug. 3, 2023

Related U.S. Application Data

(63) Continuation of application No. 18/030,442, filed as application No. PCT/KR2022/001006 on Jan. 19, 2022.

(30) Foreign Application Priority Data

Jan. 19, 2021 (KR) ........................ 10-2021-0007278
Feb. 19, 2021 (KR) ........................ 10-2021-0022881
(Continued)

(51) Int. Cl.
*H01M 50/474* (2021.01)
*H01M 50/107* (2021.01)
(Continued)

(52) U.S. Cl.
CPC ....... *H01M 50/474* (2021.01); *H01M 50/107* (2021.01); *H01M 50/152* (2021.01); *H01M 50/538* (2021.01); *H01M 50/566* (2021.01)

(58) Field of Classification Search
CPC ............ H01M 50/474; H01M 50/107; H01M 50/538; H01M 50/152; H01M 50/566
See application file for complete search history.

(56) References Cited

U.S. PATENT DOCUMENTS 3,761,314 A    9/1973   Cailley
5,576,113 A    11/1996  Hirofumi et al.
(Continued)

FOREIGN PATENT DOCUMENTS

CN    1170782 A    1/1998
CN    1407642 A    4/2003
(Continued)

OTHER PUBLICATIONS

International Search Report for PCT/KR2022/001006 (PCT/ISA/210) dated May 18, 2022.
(Continued)

*Primary Examiner* — Jane J Rhee
(74) *Attorney, Agent, or Firm* — Birch, Stewart, Kolasch & Birch, LLP

(57) ABSTRACT

A battery can include an electrode assembly having a first electrode, a second electrode and a separator. The first
(Continued)

electrode can include a first active material region coated with an active material layer along a winding direction and a first uncoated region not coated with the active material layer, and at least part of the first uncoated region used as an electrode tab. The battery can further include a first current collector coupled to at least part of the first uncoated region on the electrode assembly, a battery housing to accommodate the electrode assembly and the first current collector, and an insulator between an inner surface of the battery housing facing the first uncoated region or the first current collector and the first uncoated region or the first current collector to block the electrical connection between the first uncoated region and the battery housing.

28 Claims, 15 Drawing Sheets

(30) Foreign Application Priority Data

| Feb. 19, 2021 | (KR) | 10-2021-0022891 |
|---|---|---|
| Feb. 19, 2021 | (KR) | 10-2021-0022894 |
| Feb. 19, 2021 | (KR) | 10-2021-0022897 |
| Feb. 23, 2021 | (KR) | 10-2021-0024424 |
| Mar. 8, 2021 | (KR) | 10-2021-0030291 |
| Mar. 8, 2021 | (KR) | 10-2021-0030300 |
| Apr. 9, 2021 | (KR) | 10-2021-0046798 |
| May 4, 2021 | (KR) | 10-2021-0058183 |
| Jun. 14, 2021 | (KR) | 10-2021-0077046 |
| Jun. 28, 2021 | (KR) | 10-2021-0084326 |
| Oct. 1, 2021 | (KR) | 10-2021-0131205 |
| Oct. 1, 2021 | (KR) | 10-2021-0131207 |
| Oct. 1, 2021 | (KR) | 10-2021-0131208 |
| Oct. 1, 2021 | (KR) | 10-2021-0131215 |
| Oct. 1, 2021 | (KR) | 10-2021-0131225 |
| Oct. 14, 2021 | (KR) | 10-2021-0137001 |
| Oct. 15, 2021 | (KR) | 10-2021-0137856 |
| Oct. 22, 2021 | (KR) | 10-2021-0142196 |
| Nov. 9, 2021 | (KR) | 10-2021-0153472 |
| Nov. 19, 2021 | (KR) | 10-2021-0160823 |
| Nov. 24, 2021 | (KR) | 10-2021-0163809 |
| Nov. 26, 2021 | (KR) | 10-2021-0165866 |
| Dec. 3, 2021 | (KR) | 10-2021-0172446 |
| Dec. 10, 2021 | (KR) | 10-2021-0177091 |
| Dec. 31, 2021 | (KR) | 10-2021-0194572 |
| Dec. 31, 2021 | (KR) | 10-2021-0194593 |
| Dec. 31, 2021 | (KR) | 10-2021-0194610 |
| Dec. 31, 2021 | (KR) | 10-2021-0194611 |
| Dec. 31, 2021 | (KR) | 10-2021-0194612 |
| Jan. 5, 2022 | (KR) | 10-2022-0001802 |

(51) Int. Cl.
*H01M 50/152* (2021.01)
*H01M 50/538* (2021.01)
*H01M 50/566* (2021.01)

(56) References Cited

U.S. PATENT DOCUMENTS

| 5,665,483 | A | 9/1997 | Saito et al. |
|---|---|---|---|
| 5,849,431 | A | 12/1998 | Kita et al. |
| 6,399,237 | B1 | 6/2002 | Souliac et al. |
| 6,451,473 | B1 | 9/2002 | Saito et al. |
| 6,653,017 | B2 | 11/2003 | Satoh et al. |
| 6,677,082 | B2 | 1/2004 | Thackeray et al. |
| 6,680,143 | B2 | 1/2004 | Thackeray et al. |
| 7,273,678 | B2 | 9/2007 | Akita et al. |
| 8,007,549 | B2 | 8/2011 | Ligeois et al. |
| 9,496,539 | B2 | 11/2016 | Tyler et al. |
| 9,496,557 | B2 | 11/2016 | Fuhr et al. |
| 10,840,555 | B2 | 11/2020 | Iwama et al. |
| 2001/0004505 | A1 | 6/2001 | Kim et al. |
| 2001/0051297 | A1 | 12/2001 | Nemoto et al. |
| 2001/0053477 | A1 | 12/2001 | Kitoh et al. |
| 2002/0061435 | A1 | 5/2002 | Hisai |
| 2002/0110729 | A1 | 8/2002 | Hozumi et al. |
| 2003/0035993 | A1 | 2/2003 | Enomoto et al. |
| 2003/0049536 | A1 | 3/2003 | Wiepen |
| 2003/0064285 | A1 | 4/2003 | Kawamura et al. |
| 2004/0023108 | A1 | 2/2004 | Nakanishi et al. |
| 2005/0048365 | A1 | 3/2005 | Miyahisa et al. |
| 2005/0058184 | A1 | 3/2005 | Paul et al. |
| 2005/0118499 | A1 | 6/2005 | Kim |
| 2005/0158620 | A1 | 7/2005 | Kim et al. |
| 2005/0181272 | A1 | 8/2005 | Kim |
| 2005/0214640 | A1 | 9/2005 | Kim |
| 2005/0238951 | A1 | 10/2005 | Yoo et al. |
| 2005/0260487 | A1 | 11/2005 | Kim et al. |
| 2005/0260489 | A1 | 11/2005 | Kim |
| 2005/0287428 | A1 | 12/2005 | Cheon et al. |
| 2005/0287432 | A1 | 12/2005 | Cheon et al. |
| 2006/0024574 | A1 | 2/2006 | Yim et al. |
| 2006/0063063 | A1 | 3/2006 | Mori et al. |
| 2006/0204841 | A1 | 9/2006 | Satoh et al. |
| 2008/0026293 | A1 | 1/2008 | Marple et al. |
| 2008/0038629 | A1 | 2/2008 | Okabe et al. |
| 2008/0057394 | A1 | 3/2008 | Rigobert et al. |
| 2008/0145756 | A1 | 6/2008 | Taniguichi |
| 2008/0182159 | A1 | 7/2008 | Mitani et al. |
| 2009/0104520 | A1 | 4/2009 | Marple |
| 2009/0208830 | A1 | 8/2009 | Okabe et al. |
| 2009/0208836 | A1 | 8/2009 | Fuhr et al. |
| 2009/0239133 | A1 | 9/2009 | Kosugi |
| 2009/0280406 | A1 | 11/2009 | Kozuki |
| 2009/0311583 | A1 | 12/2009 | Wu |
| 2010/0081052 | A1 | 4/2010 | Morishima et al. |
| 2010/0129716 | A1 | 5/2010 | Kato et al. |
| 2010/0151317 | A1 | 6/2010 | Kim et al. |
| 2010/0216001 | A1 | 8/2010 | Byun et al. |
| 2010/0266893 | A1 | 10/2010 | Martin et al. |
| 2010/0316897 | A1 | 12/2010 | Kozuki et al. |
| 2010/0330414 | A1 | 12/2010 | Mori |
| 2011/0027644 | A1 | 2/2011 | Kiyama |
| 2011/0087227 | A1 | 3/2011 | Sohn |
| 2011/0171508 | A1 | 7/2011 | Kim |
| 2011/0256433 | A1 | 10/2011 | Fuhr et al. |
| 2012/0058375 | A1 | 3/2012 | Tanaka et al. |
| 2012/0094169 | A1 | 4/2012 | Kim et al. |
| 2012/0231641 | A1 | 9/2012 | Sugai et al. |
| 2012/0297611 | A1 | 11/2012 | Ma |
| 2013/0136977 | A1 | 5/2013 | Masuda |
| 2013/0183556 | A1 | 7/2013 | Kim |
| 2013/0273401 | A1 | 10/2013 | Lee et al. |
| 2013/0323574 | A1 | 12/2013 | Tsunaki et al. |
| 2014/0079971 | A1 | 3/2014 | Huang |
| 2014/0113185 | A1 | 4/2014 | Mori et al. |
| 2014/0162097 | A1 | 6/2014 | Fuhr et al. |
| 2014/0205868 | A1 | 7/2014 | Phillips |
| 2014/0212695 | A1 | 7/2014 | Lane et al. |
| 2014/0234676 | A1 | 8/2014 | Tyler et al. |
| 2014/0255748 | A1 | 9/2014 | Jan et al. |
| 2015/0104694 | A1 | 4/2015 | Okuda et al. |
| 2015/0140379 | A1 | 5/2015 | Yau |
| 2015/0155532 | A1 | 6/2015 | Harayama et al. |
| 2016/0043373 | A1 | 2/2016 | Arishima et al. |
| 2016/0099451 | A1 | 4/2016 | Murai et al. |
| 2016/0141589 | A1 | 5/2016 | Kang et al. |
| 2016/0155998 | A1 | 6/2016 | Wakimoto et al. |
| 2016/0181577 | A1 | 6/2016 | Kajiwara et al. |
| 2016/0226056 | A1 | 8/2016 | Masson et al. |
| 2016/0329542 | A1 | 11/2016 | Tyler et al. |
| 2017/0018750 | A1 | 1/2017 | Wintner |
| 2017/0047575 | A1 | 2/2017 | Tsuji et al. |
| 2017/0062789 | A1 | 3/2017 | Sim et al. |
| 2017/0149042 | A1 | 5/2017 | Koo et al. |

(56) References Cited

U.S. PATENT DOCUMENTS

| | | |
|---|---|---|
| 2017/0200935 A1 | 7/2017 | Hong et al. |
| 2017/0187068 A1 | 8/2017 | Morisawa et al. |
| 2017/0256769 A1 | 9/2017 | Wynn et al. |
| 2017/0372848 A1 | 12/2017 | Yoon et al. |
| 2018/0123143 A1 | 5/2018 | Sato et al. |
| 2018/0130995 A1 | 5/2018 | Nemoto et al. |
| 2018/0182560 A1 | 6/2018 | Khakhalev |
| 2018/0205044 A1 | 7/2018 | Urushihara |
| 2018/0219208 A1 | 8/2018 | Dewulf et al. |
| 2018/0247773 A1 | 8/2018 | Lee |
| 2018/0375162 A1 | 12/2018 | Wakimoto et al. |
| 2019/0006639 A1 | 1/2019 | Ito |
| 2019/0148683 A1 | 5/2019 | Kwon et al. |
| 2019/0221791 A1 | 7/2019 | Wakimoto |
| 2019/0296283 A1 | 9/2019 | Chen et al. |
| 2019/0379019 A1 | 12/2019 | Fukuda et al. |
| 2019/0379028 A1 | 12/2019 | Lim et al. |
| 2019/0386272 A1* | 12/2019 | Shin .................. H01M 50/169 |
| 2020/0044289 A1 | 2/2020 | Pasma et al. |
| 2020/0083492 A1 | 3/2020 | Koshiol et al. |
| 2020/0119328 A1 | 4/2020 | Zheng et al. |
| 2020/0127249 A1 | 4/2020 | Yoon et al. |
| 2020/0144581 A1 | 5/2020 | Thunot |
| 2020/0144676 A1 | 5/2020 | Tsuruta et al. |
| 2020/0203773 A1 | 6/2020 | Fujita et al. |
| 2020/0212374 A1* | 7/2020 | Gaugler ............ H01M 10/0427 |
| 2020/0235369 A1 | 7/2020 | Jeong et al. |
| 2020/0295341 A1 | 9/2020 | Kim et al. |
| 2020/0388856 A1 | 12/2020 | Hayashi |
| 2021/0039195 A1 | 2/2021 | Jost et al. |
| 2021/0075051 A1 | 3/2021 | Zhou |
| 2021/0167467 A1 | 6/2021 | Yang et al. |
| 2021/0210792 A1 | 7/2021 | Mukai et al. |
| 2021/0257652 A1 | 8/2021 | Ko et al. |
| 2021/0273298 A1 | 9/2021 | Babinot et al. |
| 2021/0278479 A1 | 9/2021 | Park et al. |
| 2021/0280835 A1 | 9/2021 | Peng et al. |
| 2021/0344033 A1 | 11/2021 | Park et al. |
| 2021/0376333 A1 | 12/2021 | Shiozaki et al. |
| 2022/0037712 A1* | 2/2022 | Kritzer ................ H01M 10/659 |
| 2022/0069335 A1 | 3/2022 | Kim |
| 2022/0123444 A1 | 4/2022 | Liu et al. |
| 2023/0123195 A1 | 4/2023 | Fang et al. |

FOREIGN PATENT DOCUMENTS

| | | |
|---|---|---|
| CN | 1426609 A | 6/2003 |
| CN | 1444303 A | 9/2003 |
| CN | 1495943 A | 5/2004 |
| CN | 2681364 Y | 2/2005 |
| CN | 1700495 A | 11/2005 |
| CN | 1832228 A | 9/2006 |
| CN | 1309105 C | 4/2007 |
| CN | 101010818 A | 8/2007 |
| CN | 100349321 C | 11/2007 |
| CN | 101083317 A | 12/2007 |
| CN | 200990393 Y | 12/2007 |
| CN | 201066701 Y | 5/2008 |
| CN | 201117731 Y | 9/2008 |
| CN | 101286572 A | 10/2008 |
| CN | 100468827 C | 3/2009 |
| CN | 101404338 A | 4/2009 |
| CN | 101501884 A | 6/2009 |
| CN | 201466087 U | 5/2010 |
| CN | 201638890 U | 11/2010 |
| CN | 201725845 U | 1/2011 |
| CN | 201781028 U | 3/2011 |
| CN | 202423400 U | 9/2012 |
| CN | 103280543 A | 9/2013 |
| CN | 103427063 A | 12/2013 |
| CN | 203553261 U | 4/2014 |
| CN | 103797611 A | 5/2014 |
| CN | 203967145 U | 11/2014 |
| CN | 104396044 A | 3/2015 |
| CN | 204230370 U | 3/2015 |
| CN | 204596910 U | 8/2015 |
| CN | 204885267 U | 12/2015 |
| CN | 105449291 A | 3/2016 |
| CN | 105655623 A | 6/2016 |
| CN | 106159350 A | 11/2016 |
| CN | 205863251 U | 1/2017 |
| CN | 106463654 A | 2/2017 |
| CN | 107112597 A | 8/2017 |
| CN | 206461019 U | 9/2017 |
| CN | 206461044 U | 9/2017 |
| CN | 206471426 U | 9/2017 |
| CN | 104488113 B | 10/2017 |
| CN | 107275524 A | 10/2017 |
| CN | 206619636 U | 11/2017 |
| CN | 107431215 A | 12/2017 |
| CN | 107482156 A | 12/2017 |
| CN | 107851769 A | 3/2018 |
| CN | 207217654 U | 4/2018 |
| CN | 108063192 A | 5/2018 |
| CN | 207381468 U | 5/2018 |
| CN | 108496269 A | 9/2018 |
| CN | 108695451 A | 10/2018 |
| CN | 208400966 U | 1/2019 |
| CN | 110048065 A | 7/2019 |
| CN | 209328958 U | 8/2019 |
| CN | 110459705 A | 11/2019 |
| CN | 110476273 A | 11/2019 |
| CN | 110581235 A | 12/2019 |
| CN | 209912959 U | 1/2020 |
| CN | 110870099 A | 3/2020 |
| CN | 111033807 A | 4/2020 |
| CN | 111446386 A | 7/2020 |
| CN | 211208547 U | 8/2020 |
| CN | 111668534 A | 9/2020 |
| CN | 111952525 A | 11/2020 |
| CN | 211879534 U | 11/2020 |
| CN | 212182379 U | 12/2020 |
| CN | 112310574 A | 2/2021 |
| CN | 112335075 A | 2/2021 |
| CN | 212907981 U | 4/2021 |
| CN | 112909445 A | 6/2021 |
| CN | 113193165 A | 7/2021 |
| CN | 2143778637 U | 10/2021 |
| CN | 215342666 U | 12/2021 |
| CN | 114865242 A | 6/2022 |
| EP | 2 677 592 A1 | 12/2013 |
| EP | 2 728 647 A1 | 5/2014 |
| EP | 2 876 338 A1 | 5/2015 |
| EP | 2160777 B1 | 3/2019 |
| EP | 4087034 A1 | 11/2022 |
| EP | 4336649 A1 | 3/2024 |
| GB | 1191105 A | 5/1970 |
| GB | 2564670 A | 1/2019 |
| JP | 62-7157 U | 1/1987 |
| JP | 6-124696 A | 5/1994 |
| JP | 7-201309 A | 8/1995 |
| JP | 8-22818 A | 1/1996 |
| JP | 8-102313 A | 4/1996 |
| JP | 8-180849 A | 7/1996 |
| JP | 10-83833 A | 3/1998 |
| JP | 10-106532 A | 4/1998 |
| JP | 10-214609 A | 8/1998 |
| JP | 10-228908 A | 8/1998 |
| JP | 11-67279 A | 3/1999 |
| JP | 11-176447 A | 7/1999 |
| JP | 11-297301 A | 10/1999 |
| JP | 2955135 B2 | 10/1999 |
| JP | 11-329398 A | 11/1999 |
| JP | 2000-243433 A | 9/2000 |
| JP | 2001-28274 A | 1/2001 |
| JP | 2001-43844 A | 2/2001 |
| JP | 2001-52756 A | 2/2001 |
| JP | 2001-148238 A | 5/2001 |
| JP | 2001-256954 A | 9/2001 |
| JP | 3252846 B2 | 2/2002 |
| JP | 2002-157991 A | 5/2002 |
| JP | 2002-289170 A | 10/2002 |
| JP | 2003-115286 A | 4/2003 |
| JP | 2004-14173 A | 1/2004 |

(56) References Cited

FOREIGN PATENT DOCUMENTS

| | | |
|---|---|---|
| JP | 2004-95487 A | 3/2004 |
| JP | 2004-253253 A | 9/2004 |
| JP | 3588264 B2 | 11/2004 |
| JP | 3632586 B2 | 3/2005 |
| JP | 2005-100927 A | 4/2005 |
| JP | 2005-129433 A | 5/2005 |
| JP | 2005-166664 A | 6/2005 |
| JP | 2005-276840 A | 10/2005 |
| JP | 3718872 B2 | 11/2005 |
| JP | 3751782 B2 | 3/2006 |
| JP | 2006-120606 A | 5/2006 |
| JP | 2006-278018 A | 10/2006 |
| JP | 3096519 B2 | 1/2007 |
| JP | 2007-234486 A | 9/2007 |
| JP | 2008-66302 A | 3/2008 |
| JP | 2008-123848 A | 5/2008 |
| JP | 2008-243811 A | 10/2008 |
| JP | 2009-104925 A | 5/2009 |
| JP | 2009-110885 A | 5/2009 |
| JP | 2009-176449 A | 8/2009 |
| JP | 4346637 B2 | 10/2009 |
| JP | 2009-259452 A | 11/2009 |
| JP | 2009-289672 A | 12/2009 |
| JP | 4401634 B2 | 1/2010 |
| JP | 2010-33940 A | 2/2010 |
| JP | 4430587 B2 | 3/2010 |
| JP | 2010-529624 A | 8/2010 |
| JP | 2011-113845 A | 6/2011 |
| JP | 2011-159582 A | 8/2011 |
| JP | 2012-74359 A | 4/2012 |
| JP | 2012-510143 A | 4/2012 |
| JP | 2012-180858 A | 8/2012 |
| JP | 5019557 B2 | 9/2012 |
| JP | 5030379 B2 | 9/2012 |
| JP | 2012-190739 A | 10/2012 |
| JP | 5051410 B2 | 10/2012 |
| JP | 2013-246966 A | 12/2013 |
| JP | 5651536 B2 | 1/2015 |
| JP | 2015-106613 A | 6/2015 |
| JP | 2015-222685 A | 12/2015 |
| JP | 5877724 B2 | 3/2016 |
| JP | 2016-100323 A | 5/2016 |
| JP | 5935878 B2 | 6/2016 |
| JP | 2016-225014 A | 12/2016 |
| JP | 2017-143004 A | 8/2017 |
| JP | 2018-507544 A | 3/2018 |
| JP | 2018-92778 A | 6/2018 |
| JP | 2018-163765 A | 10/2018 |
| JP | 6406836 B2 | 10/2018 |
| JP | 2019-46639 A | 3/2019 |
| JP | 2020-71898 A | 5/2020 |
| JP | 6735445 B2 | 8/2020 |
| JP | 2020-527841 A | 9/2020 |
| JP | 2020-202038 A | 12/2020 |
| JP | WO2019/194182 A1 | 4/2021 |
| KR | 10-2001-0017098 A | 3/2001 |
| KR | 10-2001-0038811 A | 5/2001 |
| KR | 2001-0056363 A | 7/2001 |
| KR | 10-0490526 B1 | 8/2005 |
| KR | 10-2005-0110460 A | 11/2005 |
| KR | 10-2005-0121904 A | 12/2005 |
| KR | 10-2005-0121914 A | 12/2005 |
| KR | 10-0551885 B1 | 2/2006 |
| KR | 10-2006-0022128 A | 3/2006 |
| KR | 10-0612236 B1 | 8/2006 |
| KR | 10-2007-0033762 A | 3/2007 |
| KR | 10-2008-0047165 A | 5/2008 |
| KR | 10-2010-0068080 A | 6/2010 |
| KR | 10-2010-0089092 A | 8/2010 |
| KR | 10-2010-0096100 A | 9/2010 |
| KR | 10-2013-0084086 A | 7/2013 |
| KR | 10-1320581 B1 | 10/2013 |
| KR | 10-1446151 B1 | 10/2014 |
| KR | 10-2016-0043725 A | 4/2016 |
| KR | 10-2016-0092748 A | 8/2016 |
| KR | 10-1679413 B1 | 11/2016 |
| KR | 10-2017-0025074 A | 3/2017 |
| KR | 10-2017-0033543 A | 3/2017 |
| KR | 10-1743136 B1 | 6/2017 |
| KR | 10-1807353 B1 | 12/2017 |
| KR | 10-2018-0026910 A | 3/2018 |
| KR | 10-1839158 B1 | 3/2018 |
| KR | 10-2018-0106367 A | 10/2018 |
| KR | 10-2018-0116004 A | 10/2018 |
| KR | 10-2018-0116156 A | 10/2018 |
| KR | 10-2018-0129115 A | 12/2018 |
| KR | 10-2019-0030016 A | 3/2019 |
| KR | 10-2019-0040699 A | 4/2019 |
| KR | 10-2019-0078094 A | 7/2019 |
| KR | 10-2042999 B1 | 11/2019 |
| KR | 10-2020-0007561 A | 1/2020 |
| KR | 10-2020-0020173 A | 2/2020 |
| KR | 10-2020-0037599 A | 4/2020 |
| KR | 10-2020-0039214 A | 4/2020 |
| KR | 10-2020-0041625 A | 4/2020 |
| KR | 10-2128970 B1 | 6/2020 |
| KR | 10-2021-0006203 A | 1/2021 |
| TW | I679311 B | 12/2019 |
| WO | WO 00/39868 A1 | 7/2000 |
| WO | WO 01/59856 A1 | 8/2001 |
| WO | WO 2006/035980 A1 | 4/2006 |
| WO | WO 2006/085437 A1 | 8/2006 |
| WO | WO 2010/146154 A2 | 12/2010 |
| WO | WO 2012/090599 A1 | 7/2012 |
| WO | WO 2013/024774 A1 | 2/2013 |
| WO | WO 2015/025388 A1 | 2/2015 |
| WO | WO 2018/117457 A1 | 6/2018 |
| WO | WO 2020/060069 A1 | 3/2020 |
| WO | WO 2020/149350 A1 | 7/2020 |
| WO | WO 2020/159071 A1 | 8/2020 |
| WO | WO 2020/0171426 A1 | 8/2020 |
| WO | WO 2021/020119 A1 | 2/2021 |
| WO | WO 2021/020237 A1 | 2/2021 |

OTHER PUBLICATIONS

U.S. Office Action for U.S. Appl. No. 17/592,597, dated Jun. 21, 2023.
"Laser Welding vs. Arc (Tig) Welding of Medical Instruments," Accumet, Oct. 22, 2014, 2 pages total.
Ma et al., "Electro-Thermal Modeling of a Lithium-ion Battery System," Sae International, vol. 3, Issue 2, Oct. 25, 2010, p. 306.
U.S. Office Action for U.S. Appl. No. 17/579,380, dated Jul. 20, 2023.
U.S. Office Action for U.S. Appl. No. 18/086,410, dated Jul. 24, 2023.
U.S. Office Action for U.S. Appl. No. 18/086,485, dated Aug. 15, 2023.
U.S. Advisory Action for U.S. Appl. No. 18/086,485, dated Nov. 3, 2023.
U.S. Office Action for U.S. Appl. No. 18/132,166, dated Oct. 2, 2023.
U.S. Office Action for U.S. Appl. No. 17/592,594, dated Nov. 24, 2023.
U.S. Office Action for U.S. Appl. No. 18/132,140, dated Nov. 28, 2023.
Nigel, "Tesla 4680 Cell", Battery Design, Nov. 18, 2022, https://batterydesign.net/tesla-4680-cell, 24 pages.
U.S. Notice of Allowance dated Jan. 16, 2024 for U.S. Appl. No. 18/131,751.
Third Party Observation dated Feb. 2, 2024 for European Application No. 22742840.6.
ASM Aerospace Specification Metals Inc., "Aluminum 5052-H19 Foil", 2001, https://asm.matweb.com/search/SpecificMaterial.asp?bassnum=ma5052h19, 2 pages.
Iowa State University, Center for Nondestructive Evaluation NDE-Ed.org, Physics of Nondestructive Evaluation>Electricity, 2021, https://www.nde-ed.org/Physics/Electricity/voltage.xhtml, 14 pages.
Third Party Observation dated Feb. 13, 2024 for European Application No. 22742834.9.

(56) References Cited

OTHER PUBLICATIONS

U.S. Notice of Allowance for U.S. Appl. No. 17/579,380, dated Feb. 14, 2024.
U.S. Office Action for U.S. Appl. No. 17/665,896, dated Feb. 12, 2024.
Youtube, "Tesla Battery Day", Sep. 22, 2020, https://www.youtube.com/watch?v=I6T9xleZTds, 2 pages.
Automotive & Accessories Magazine, "The core topic of Tesla's 'Battery Day': reducing battery manufacturing costs", Sep. 23, 2020, 6 pages.
Third Party Observation dated Feb. 26, 2024 for European Application No. 22152256.8.
Third Party Observation dated Feb. 26, 2024 for European Application No. 22152262.6.
Full English Translation of Japanese Patent Application No. 2002-289170-A dated Oct. 4, 2002.
Third Party Observation dated Apr. 9, 2924 for European Application No. 22742833.1.
Third Party Observation dated Apr. 17, 2024 for European Application No. 22742840.6.
Third Party Observation dated Apr. 18, 2024 for European Application No. 23214922.9.
Third Party Observation dated Apr. 19, 2024 for European Application No. 22742838.0.
Third Party Observation dated Apr. 25, 2024 for European Application No. 22742834.9.
Third Party Observation dated Apr. 4, 2024 for U.S. Appl. No. 17/592,576.
Third Party Observation dated Mar. 22, 2024 for U.S. Appl. No. 17/592,672.
European Communication pursuant to Rule 114(2) EPC dated Apr. 16, 2024 for European Application No. 22756576.9.
European Communication pursuant to Rule 114(2) EPC dated Apr. 16, 2024 for European Application No. 22895785.8.
European Communication pursuant to Rule 114(2) EPC dated Apr. 30, 2024 for European Application No. 22856151.0.
European Communication pursuant to Rule 114(2) EPC dated Jun. 6, 2024 for European Application No. 22756569.4.
European Communication pursuant to Rule 114(2) EPC dated May 27, 2024 for European Application No. 22756569.4.
European Communication pursuant to Rule 114(2) EPC dated May 3, 2024 for European Application No. 22756574.4.
European Communication pursuant to Rule 114(2) EPC dated May 3, 2024 for European Application No. 22881171.7.
European Ccmmunication pursuant to Rule 114(2) EPC dated May 8, 2024 for European Application No. 22883724.1.
Partial Supplementary European Search Report for dated Jul. 15, 2024 for European Application No. 22742840.6.
Third Party Observsation dated Jul. 22, 2024 for European Application No. 22881172.5.
U.S. Office Action for U.S. Appl. No. 18/086,402 dated Jun. 12, 2024.

* cited by examiner

BATTERY, AND BATTERY PACK AND VEHICLE COMPRISING THE SAME

CROSS REFERENCE TO RELATED APPLICATIONS

This application is a Continuation of U.S. patent application Ser. No. 18/030,442, filed on Apr. 5, 2023, which is a National Stage of International Application No. PCT/KR2022/001006 filed Jan. 19, 2022, which claims priority to Korean Patent Application No. 10-2021-0007278 filed on Jan. 19, 2021, Korean Patent Application No. 10-2021-0022897 filed on Feb. 19, 2021, Korean Patent Application No. 10-2021-0022894 filed on Feb. 19, 2021, Korean Patent Application No. 10-2021-0022891 filed on Feb. 19, 2021, Korean Patent Application No. 10-2021-0022881 filed on Feb. 19, 2021, Korean Patent Application No. 10-2021-0024424 filed on Feb. 23, 2021, Korean Patent Application No. 10-2021-0030300 filed on Mar. 8, 2021, Korean Patent Application No. 10-2021-0030291 filed on Mar. 8, 2021, Korean Patent Application No. 10-2021-0046798 filed on Apr. 9, 2021, Korean Patent Application No. 10-2021-0058183 filed on May 4, 2021, Korean Patent Application No. 10-2021-0077046 filed on Jun. 14, 2021, Korean Patent Application No. 10-2021-0084326 filed on Jun. 28, 2021, Korean Patent Application No. 10-2021-0131225 filed on Oct. 1, 2021, Korean Patent Application No. 10-2021-0131215 filed on Oct. 1, 2021, Korean Patent Application No. 10-2021-0131205 filed on Oct. 1, 2021, Korean Patent Application No. 10-2021-0131208 filed on Oct. 1, 2021, Korean Patent Application No. 10-2021-0131207 filed on Oct. 1, 2021, Korean Patent Application No. 10-2021-0137001 filed on Oct. 14, 2021, Korean Patent Application No. 10-2021-0137856 filed on Oct. 15, 2021, Korean Patent Application No. 10-2021-0142196 filed on Oct. 22, 2021, Korean Patent Application No. 10-2021-0153472 filed on Nov. 9, 2021, Korean Patent Application No. 10-2021-0160823 filed on Nov. 19, 2021, Korean Patent Application No. 10-2021-0163809 filed on Nov. 24, 2021, Korean Patent Application No. 10-2021-0165866 filed on Nov. 26, 2021, Korean Patent Application No. 10-2021-0172446 filed on Dec. 3, 2021, Korean Patent Application No. 10-2021-0177091 filed on Dec. 10, 2021, Korean Patent Application No. 10-2021-0194593 filed on Dec. 31, 2021, Korean Patent Application No. 10-2021-0194610 filed on Dec. 31, 2021, Korean Patent Application No. 10-2021-0194572 filed on Dec. 31, 2021, Korean Patent Application No. 10-2021-0194612 filed on Dec. 31, 2021, Korean Patent Application No. 10-2021-0194611 filed on Dec. 31, 2021, and Korean Patent Application No. 10-2022-0001802 filed on Jan. 5, 2022 with the Korean Intellectual Property Office, where the entire contents of all these applications are hereby expressly incorporated by reference into the present application.

BACKGROUND OF THE DISCLOSURE

Field

The present disclosure relates to a battery, and a battery pack and a vehicle comprising the same. More particularly, the present disclosure relates to a battery having a structure in which a positive electrode terminal and a negative electrode terminal are arranged close to each other on one side of the battery without greatly changing the structure of the existing battery, and a battery pack and a vehicle comprising the same.

Discussion of the Related Art

In a battery, a jelly roll having a positive electrode tab and a negative electrode tab extending upward and downward along the heightwise direction of a battery housing respectively may be applied to maximize the current collection efficiency.

According to the above-described structure, the positive electrode tab and the negative electrode tab extend to two sides of the jelly roll in the heightwise direction, so there is a likelihood that the positive electrode tab may contact the battery housing. When the battery housing is electrically connected to the negative electrode tab, a short circuit may occur in the event of additional contact between the positive electrode tab and the battery housing. When a short circuit occurs in the battery, heat generation or explosion of the battery may occur. Accordingly, an insulation member is needed to effectively prevent the electrical contact between the positive electrode tab extending upwards and the battery housing.

Accordingly, there is a need for an approach to provide a battery with low internal resistance of the battery and low short risk, and a battery pack and a vehicle comprising the same.

Additionally, the battery having the above-described structure may have an empty space, in particular, between the positive electrode tab and the upper surface of the battery housing or between the positive electrode current collector and the upper surface of the battery housing. This empty space may cause the jelly roll to move within the battery housing, in particular, along the vertical direction, i.e., the heightwise direction of the battery. When the jelly roll moves in the vertical direction, damage may occur to the coupling part between the current collector and the uncoated region, and moreover, damage may occur to the coupling part between the current collector and the battery housing and the coupling part between the current collector and the terminal.

Accordingly, it is necessary to minimize the movement space of the jelly roll. Additionally, when an additional component applied to reduce the movement space of the jelly roll is used, the procedural complexity may increase and the manufacturing cost may rise, and accordingly there is a need to solve the problem by making good use of the existing component.

Meanwhile, as batteries are applied to electric vehicles, the form factor of batteries increases. That is, compared to the existing 1865, 2170 form factor batteries, the diameter and height of batteries is increasing. The increased form factor leads to increased energy density, enhanced safety against thermal runaway and improved cooling efficiency.

The energy density of batteries may be further increased by minimizing the unnecessary space inside the battery housing with the increasing form factor. Accordingly, it is necessary to optimally design a component used for electrical insulation between the electrode assembly and the battery housing to ensure electrical insulation and increase the battery capacity.

SUMMARY OF THE DISCLOSURE

The present disclosure is designed to solve the above-described problem, and therefore the present disclosure is aimed at reducing the internal resistance of a battery and effectively preventing an internal short circuit.

Additionally, the present disclosure is aimed at preventing damage from occurring in an electrical coupling part due to the movement of an electrode assembly in a battery housing.

Additionally, the present disclosure is aimed at preventing the movement of an electrode assembly using an existing component in the manufacture of a battery, thereby preventing increases in the manufacturing process complexity and the manufacturing cost caused by the application of an additional component.

Additionally, the present disclosure is aimed at optimizing the structure of a component used for electrical insulation of the electrode assembly to minimize an unnecessary space inside the battery with larger form factor, thereby maximizing the energy density.

However, the technical problem of the present disclosure is not limited to the above-described problem, and other problems not mentioned herein will be clearly understood by those skilled in the art from the following description.

To solve the above-described problem, a battery according to an embodiment of the present disclosure includes an electrode assembly including an electrode assembly including a first electrode, a second electrode and a separator interposed between the first electrode and the second electrode, the first electrode, the second electrode and the separator being wound around a winding axis, and the electrode assembly including a core and an outer circumferential surface, wherein the first electrode includes a first active material region coated with a first active material layer along a winding direction of the winding axis and a first uncoated region not coated with the first active material layer, and at least a part of the first uncoated region being an electrode tab; a first current collector coupled to at least a part of the first uncoated region on the electrode assembly; a battery housing configured to accommodate the electrode assembly and the first current collector; and an insulator interposed between at least one of the first uncoated region and the first current collector and an inner surface of the battery housing facing the at least one of the first uncoated region and the first current collector to block an electrical connection between the battery housing and the at least one of the first uncoated region and the first current collector.

In an aspect of the present disclosure, the insulator may include a first cover portion which covers an end of the first uncoated region and/or a surface of the first current collector facing the inner surface of the battery housing; and a second cover portion which covers an upper part of the outer circumferential surface of the electrode assembly.

Preferably, the second cover portion may be extended downward vertically from an outer periphery of the first cover portion.

Preferably, the first current collector may be coupled to the first uncoated region and interposed between the first uncoated region and the insulator.

Here, the first cover portion may cover a surface of the first current collector facing a top inner surface of the battery housing.

Preferably, the first cover portion may have a thickness corresponding to a distance between the first current collector and a top inner surface of the battery housing.

In another aspect of the present disclosure, at least a part of the first uncoated region may be split into a plurality of segments along the winding direction of the electrode assembly.

Here, the plurality of segments may be bent along a radial direction of the electrode assembly.

Preferably, the plurality of segments may overlap in multiple layers along a radial direction of the electrode assembly.

In this instance, the insulator may include a first cover portion interposed between a bent surface of the plurality of segments of the first uncoated region and the inner surface of the battery housing and/or between the first current collector and the inner surface of the battery housing; and a second cover portion which covers an upper part of the outer circumferential surface of the electrode assembly.

Here, the first current collector may be coupled onto the bent surface and is interposed between the bent surface and the insulator.

Preferably, the first cover portion may cover a surface of the first current collector facing a top inner surface of the battery housing.

Preferably, the first cover portion may have a thickness corresponding to a distance between the first current collector and the top inner surface of the battery housing.

In another aspect of the present disclosure, the second cover portion may cover an entire exposed outermost side of the first uncoated region to prevent the first uncoated region from being exposed toward an inner circumferential surface of the battery housing.

For example, an extended length of the second cover portion may be equal to or larger than an extended length of the first uncoated region.

Preferably, an extended length of the second cover portion may be equal to or larger than a length from a lower end point of a cut line between the plurality of segments to a bend location of the plurality of segments.

Preferably, a lower end of the second cover portion may be disposed at a lower position than a lower end of the first uncoated region.

In another aspect of the present disclosure, the insulator may include an insulating polymer material.

In another aspect of the present disclosure, the insulator may include a material having elastic properties.

In another aspect of the present disclosure, the insulator may have a center hole having a predetermined diameter at a center of the first cover portion.

Here, a center of the first current collector and a winding center of the electrode assembly corresponding to the winding axis may be disposed on a same line.

In another aspect of the present disclosure, a diameter of the first current collector may be equal to or smaller than the predetermined diameter of the center hole of the insulator.

Preferably, the diameter of the first current collector may be larger than a diameter of a winding center hole at the winding center of the electrode assembly.

Preferably, the first cover portion may have a thickness corresponding to a distance between an end of the first uncoated region and a top inner surface of the battery housing.

In another aspect of the present disclosure, at least a part of the first uncoated region may be split into a plurality of segments along the winding direction of the electrode assembly.

Here, the plurality of segments may be bent along a radial direction of the electrode assembly.

Preferably, the plurality of segments may overlap in multiple layers along a radial direction of the electrode assembly.

Preferably, the plurality of segments of the first uncoated region may include a bent surface formed from the plurality of segments being bent, the bent surface facing a top inner surface of the battery housing, and the first cover portion is interposed between the bent surface and the top inner surface of the battery housing.

Preferably, the first cover portion may have a thickness corresponding to a distance between the bent surface and the top inner surface of the battery housing.

In another aspect of the present disclosure, the battery may further include a terminal electrically connected to the first uncoated region, wherein at least a part of the terminal is exposed through a through-hole on top of the battery housing.

In this instance, the terminal may include a body portion penetrating the through-hole; an outer flange portion on a top outer surface of the battery housing and extending from one side periphery of the body portion along the top outer surface; an inner flange portion on a top inner surface of the battery housing and extending from an opposite side periphery of the body portion toward the inner surface of the battery housing; and a flat portion overlapping the through-hole.

Preferably, the flat portion and the top inner surface of the battery housing may be parallel to each other.

Preferably, the flat portion and the first current collector may be parallel to each other.

In another aspect of the present disclosure, the body portion, the inner flange portion and the flat portion of the terminal may pass through the through-hole into the battery housing.

For example, the inner flange portion may be riveted and fixed to the top inner surface of the battery housing.

In another aspect of the present disclosure, the predetermined diameter of the center hole of the insulator may be equal to or larger than a diameter of the body portion.

In another aspect of the present disclosure, the predetermined diameter of the center hole of the insulator may be equal to or larger than a diameter of the inner flange portion.

In another aspect of the present disclosure, the body portion of the terminal may pass through the center hole of the insulator.

Preferably, the flat portion of the terminal may be electrically coupled to the first current collector through the center hole of the insulator.

For example, the flat portion of the terminal may be coupled to the first current collector by welding.

In another aspect of the present disclosure, the battery may further include an insulation gasket interposed between the battery housing and the terminal to block an electrical connection between the battery housing and the terminal.

Preferably, the insulation gasket may be connected to and integrally formed with the insulator.

In another aspect of the present disclosure, the battery may further include a side spacer which covers at least a part of the outer circumferential surface of the electrode assembly and contacts an inner circumferential surface of the battery housing.

Here, the side spacer may cover at least the part of the outer circumferential surface of the electrode assembly along an outer periphery of the electrode assembly.

Preferably, the side spacer may have a thickness corresponding to a distance between the outer circumferential surface of the electrode assembly and the inner circumferential surface of the battery housing.

In another aspect of the present disclosure, the side spacer may be connected to and integrally formed with the insulator.

In another aspect of the present disclosure, the side spacer may include an insulating polymer material.

In another aspect of the present disclosure, the side spacer may include a material having elastic properties.

In another aspect of the present disclosure, the second electrode may include a second active material region coated with a second active material layer along the winding direction and a second uncoated region not coated with the second active material layer, and at least a part of the second uncoated region being an electrode tab.

In another aspect of the present disclosure, the battery may further include a second current collector coupled to the second uncoated region and located below the electrode assembly.

In another aspect of the present disclosure, the battery housing may include a beading portion at an end of the battery housing and adjacent to an open portion formed on a bottom of the battery housing and being press-fitted inwards into the battery housing; and a crimping portion on a side closer to the open portion than the beading portion and being extended and bent toward the open portion.

In another aspect of the present disclosure, the second current collector may include at least one tab coupling portion coupled to the second uncoated region; and at least one housing coupling portion electrically coupled to the beading portion of the inner surface of the battery housing.

Preferably, the at least one housing coupling portion may be compressed and fixed by the crimping portion to the beading portion.

In another aspect of the present disclosure, the at least one housing coupling portion may be coupled to the beading portion by welding.

In another aspect of the present disclosure, the battery may further include a cap to cover the open portion of the battery housing.

In another aspect of the present disclosure, the battery may further include a lower spacer interposed between the cap and the second current collector to prevent the electrode assembly from moving.

Preferably, the lower spacer may have a height corresponding to a distance between the second current collector and the cap.

In another aspect of the present disclosure, the lower spacer may include an insulating polymer material.

In another aspect of the present disclosure, the lower spacer may include a material having elastic properties.

In another aspect of the present disclosure, a thickness of the first cover portion may be different from a thickness of the second cover portion.

Preferably, a thickness of the second cover portion may be smaller than a thickness of the first cover portion.

In another aspect of the present disclosure, the first cover portion may include a round portion having a predetermined radius of curvature at an outer periphery of the first cover portion.

Preferably, the round portion may be formed at an intersection between an upper surface of the first cover portion and a side of the second cover portion.

Preferably, the radius of curvature of the round portion may be equal to or smaller than a radius of curvature formed at an intersection between a top inner surface of the battery housing and a side of the battery housing.

Preferably, the round portion may come into contact with the inner surface of the battery housing without a gap.

In another aspect of the present disclosure, the first cover portion and the second cover portion may be integrally formed.

Alternatively, the first cover portion and the second cover portion may be separately formed and attached together.

In another aspect of the present disclosure, the insulation gasket may include a gasket exposure portion interposed between the outer flange portion and the battery housing; and a gasket insertion portion interposed between the inner flange portion and the battery housing.

Preferably, the gasket exposure portion and the gasket insertion portion may have different thicknesses at different locations.

In another aspect of the present disclosure, a plurality of holes having a smaller diameter than the center hole may be further formed around the center hole of the first cover portion.

Meanwhile, a battery pack according to an embodiment of the present disclosure includes a plurality of batteries according to an embodiment of the present disclosure as described above and a pack housing to accommodate the plurality of batteries.

A vehicle according to an embodiment of the present disclosure includes the battery pack according to an embodiment of the present disclosure as described above.

According to the present disclosure, it is possible to provide a battery structure having a structure in which a positive electrode terminal and a negative electrode terminal are applied in the same direction, thereby simplifying the electrical connection structure of a plurality of batteries.

Additionally, according to the present disclosure, it is possible to effectively prevent an internal short circuit of a battery by preventing the electrical contact between the uncoated region and the battery housing.

Additionally, according to the present disclosure, it is possible to minimize the movement of the electrode assembly in the battery housing, thereby preventing damage from occurring in an electrical coupling part.

According to another aspect of the present disclosure, it is possible to provide a sufficient area for welding between the electrode terminal of the battery and an electrical connection component such as a busbar, thereby ensuring sufficient joining strength between the electrode terminal and the electrical connection component, and reducing the resistance at the welded joint between the electrical connection component and the electrode terminal down to a desirable level.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION OF THE EMBODIMENTS

Figure 1:
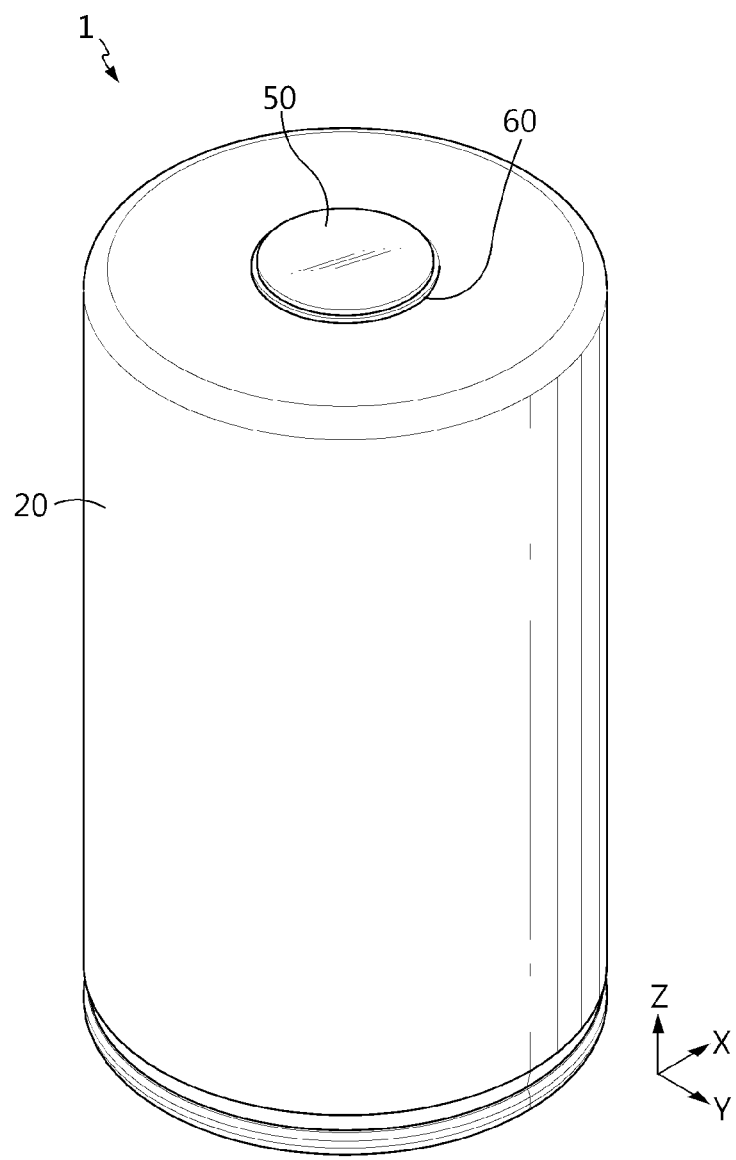
FIG. 1 is a perspective view of a battery according to an embodiment of the present disclosure.

Hereinafter, preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein, and illustrations shown in the drawings are just some most preferred embodiments of the present disclosure, but not intended to fully describe the technical aspects of the present disclosure, so it should be understood that a variety of other equivalents and modifications could have been made thereto at the time that the application was filed.

In addition, to help the understanding of the present disclosure, the accompanying drawings may illustrate some elements in exaggerated dimensions, not in actual scale. Furthermore, the same element in different embodiments may be given the same reference number.

When two components are referred to as being equal, it represents that they are 'substantially equal'. Accordingly, substantially equal may encompass all cases having the deviation regarded as a low level in the corresponding technical field, for example, the deviation of 5% or less. In addition, a uniform parameter in a predetermined area may be uniform from the average point of view.

Although the terms first, second or the like are used to describe different elements, these elements are not limited by the terms. These terms are used to distinguish one element from another, and unless stated to the contrary, a first element may be a second element.

Throughout the specification, unless stated otherwise, each element may be singular or plural.

When an element is "above (or under)" or "on (or below)" another element, the element can be on an upper surface (or a lower surface) of the other element, and intervening elements may be present between the element and the other element on (or below) the element.

Additionally, when an element is referred to as being "connected", "coupled" or "linked" to another element, the element can be directly connected or coupled to the other element, but it should be understood that intervening elements may be present between each element, or each element may be "connected", "coupled" or "linked" to each other through another element.

Throughout the specification, "A and/or B" refers to either A or B or both A and B unless expressly stated otherwise, and "C to D" refers to C or greater and D or smaller unless expressly stated otherwise.

For convenience of description, a direction that goes along a lengthwise direction of a winding axis of an electrode assembly wound in a roll shape is herein referred to as an axis direction Y. Additionally, a direction around the winding axis is herein referred to as a circumferential or peripheral direction X. Additionally, a direction that gets closer to or faces away from the winding axis is referred to as a radial direction. Among them, in particular, the direction that gets closer to the winding axis is referred to as a centripetal direction, and the direction that faces away from the winding axis is referred to as a centrifugal direction.

Referring to FIGS. 1 to 4, 8 and 9, a battery 1 according to an embodiment of the present disclosure includes an electrode assembly 10, a battery housing 20, a first current collector 30 and an insulator 40.

In addition to the above-described elements, the battery 1 may further include a terminal 50 and/or an insulation gasket 60 and/or a side spacer 70 and/or a second current collector 80 and/or a cap 90 and/or a sealing gasket 100 and/or a lower spacer 110.

The electrode assembly 10 includes a first electrode having a first polarity, a second electrode having a second polarity and a separator interposed between the first electrode and the second electrode. The first electrode corresponds to a positive or negative electrode, and the second electrode corresponds to an electrode having the opposite polarity to the first electrode.

The electrode assembly 10 may have, for example, a wound shape. That is, the electrode assembly 10 may be manufactured by winding a stack around a winding center C, the stack formed by stacking the first electrode, the second electrode and the separator interposed between the first electrode and the second electrode at least once. In this case, an additional separator may be provided on the outer circumferential surface of the electrode assembly 10 for insulation from the battery housing 20. The electrode assembly 10 may have any well-known winding structure in the related technical field without limitation.

The first electrode includes a first electrode current collector and a first active material region coated on one or two surfaces of the first electrode current collector. An uncoated region with no first active material region exists at one end in the widthwise direction of the first electrode current collector (a direction parallel to the Z axis). The uncoated region itself acts as a first electrode tab. The first uncoated region 11 is provided on the electrode assembly 10 received in the battery housing 20 in the heightwise direction (the direction parallel to the Z axis).

The second electrode includes a second electrode current collector and a second active material region coated on one or two surfaces of the second electrode current collector. An uncoated region with no second active material region exists at the other end in the widthwise direction of the second electrode current collector (the direction parallel to the Z axis). The uncoated region itself acts as a second electrode tab. The second uncoated region 12 is provided below the electrode assembly 10 received in the battery housing 20 in the heightwise direction (the direction parallel to the Z axis).

That is, the electrode assembly 10 may be an electrode assembly 10 including the first electrode, the second electrode and the separator interposed between the first electrode and the second electrode, wound around the winding axis to define a core and an outer circumferential surface. In this instance, the first electrode includes the first active material region that is coated with an active material layer along the winding direction and the first uncoated region that is not coated with the active material layer, and at least part of the first uncoated region itself may be used as the electrode tab. On the other hand, the second electrode includes the second active material region that is coated with an active material layer along the winding direction and the second uncoated region that is not coated with the active material layer, and at least part of the second uncoated region 12 itself may be used as the electrode tab.

Preferably, the electrode assembly 10 may be a wound electrode assembly 10 having a structure in which the first electrode current collector and the second current collector having a sheet shape and the separator interposed between the first and second electrode current collectors are wound in a direction. The first electrode current collector includes the first uncoated region 11 that is not coated with the active material layer at the end of the long side, and at least part of the first uncoated region 11 itself may be used as the electrode tab. Additionally, the second electrode current collector includes the second uncoated region 12 that is not coated with the active material layer at the end of the long side, and at least part of the second uncoated region 12 itself may be used as the electrode tab.

The electrode assembly 10 may be a wound electrode assembly in which the first uncoated region 11 and the second uncoated region 12 having different polarities extend in the opposite directions. That is, the first uncoated region 11 and the second uncoated region 12 may extend and protrude in the opposite directions along the widthwise direction of the electrode assembly 10, i.e., the heightwise direction of the battery 1 (the direction parallel to the Z axis).

In the present disclosure, a positive electrode active material coated on a positive electrode plate and a negative electrode active material coated on a negative electrode plate may include any known active material in the technical field pertaining to the present disclosure without limitation.

In an example, the positive electrode active material may include an alkali metal compound represented by formula $A[A_xM_y]O_{2+z}$ (A includes at least one of Li, Na or K; M includes at least one selected from Ni, Co, Mn, Ca, Mg, Al, Ti, Si, Fe, Mo, V, Zr, Zn, Cu, Al, Mo, Sc, Zr, Ru, and Cr; $x \geq 0$, $1 \leq x+y \leq 2$, $-0.1 \leq z \leq 2$; the stoichiometric coefficients x, y and z are selected to keep the compound electrically neutral).

In another example, the positive electrode active material may be an alkali metal compound $xLiM^1O_2\text{-}(1\text{-}x)Li_2M^2O_3$ ($M^1$ includes at least one element having an average trivalent oxidation state; $M^2$ includes at least one element having an average tetravalent oxidation state; $0 \leq x \leq 1$) disclosed by U.S. Pat. Nos. 6,677,082 and 6,680,143.

In still another example, the positive electrode active material may be lithium metal phosphate represented by formula $Li_aM^1{}_xFe_{1-x}M^2{}_yP_{1-y}M^3{}_zO_{4-z}$ ($M^1$ includes at least one selected from Ti, Si, Mn, Co, Fe, V, Cr, Mo, Ni, Nd, Al, Mg and Al; $M^2$ includes at least one selected from Ti, Si, Mn, Co, Fe, V, Cr, Mo, Ni, Nd, Al, Mg, Al, As, Sb, Si, Ge, V and S; $M^3$ includes a halogen group element optionally including F; $0 < a \leq 2$, $0 \leq x \leq 1$, $0 \leq y < 1$, $0 \leq z < 1$; the stoichiometric coefficients a, x, y and z are selected to keep the compound electrically neutral), or $Li_3M_2(PO_4)_3$ [M includes at least one selected from Ti, Si, Mn, Fe, Co, V, Cr, Mo, Ni, Al, Mg and Al].

Preferably, the positive electrode active material may include primary particles and/or secondary particles formed by agglomeration of the primary particles.

In an example, the negative electrode active material may include a carbon material, lithium metal or a lithium metal compound, silicon or a silicon compound, tin or a tin compound. Metal oxide having the potential of less than 2V such as $TiO_2$ and $SnO_2$ may be used as the negative electrode active material. The carbon material may include low crystalline carbon and high crystalline carbon.

For example, the separator may include a porous polymer film made of a polyolefin-based polymer such as an ethylene homopolymer, a propylene homopolymer, an ethylene/butene copolymer, an ethylene/hexene copolymer and an ethylene/methacrylate copolymer, used singly or a stack of them. In another example, the separator may include a common porous nonwoven fabric, for example, a nonwoven fabric made of high melting point glass fibers and polyethylene terephthalate fibers.

The separator may include a coating layer of inorganic particles on at least one surface thereof. Additionally, the separator itself may be a coating layer of inorganic particles. The particles that form the coating layer may be bonded to each other with a binder to create interstitial volume between adjacent particles.

The inorganic particles may be inorganics having the dielectric constant of 5 or more. Non-limiting examples of the inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

An electrolyte may be a salt having a structure of $A^+B^-$. Here, $A^+$ includes an alkali metal cation such as $Li^+$, $Na^+$, $K^+$ or a combination thereof. $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may be used by dissolving in an organic solvent. The organic solvent may include at least one of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) or γ-butyrolactone.

Meanwhile, at least part of the first uncoated region 11 may be split into a plurality of segments along the winding direction the electrode assembly 10. The segments may have, for example, a trapezoidal shape, a square or rectangular shape, a parallelogram shape, a semi-circular shape, and a semi-oval shape, and may be repeatedly arranged at a predetermined interval along the winding direction. The segments may have a larger bottom width than a top width, and the width may increase gradually and/or stepwise as it goes from bottom to top (i.e., in the z direction of FIG. 2). The plurality of segments may be bent along the radial direction of the electrode assembly 10. Here, the radial direction refers to a direction toward the core of the electrode assembly 10 or a direction toward the outer circumference of the electrode assembly 10. For example, as shown in FIG. 5B, the plurality of segments may be bent toward the core. Additionally, the plurality of segments may overlap in multiple layers. Preferably, the plurality of segments may overlap in multiple layers along the radial direction of the electrode assembly 10. Meanwhile, the plurality of segments may be notched by a laser. The segments may be formed by the well-known metal foil cutting process, for example, ultrasonic cutting or punching.

It is desirable to form a predetermined gap between the lower end of the cut line between the segments and the active material layer to prevent damage to the active material layer when bending the first uncoated region 11. It is because stress concentrates on or near the lower end of the cut line when the first uncoated region 11 is bent. Additionally, it is because it is difficult to form a pattern when cutting by a laser. The gap is preferably 0.2 to 4 mm. When the gap is adjusted to the corresponding numerical range, it is possible to prevent damage to the active material layer near the lower end of the cut line due to the stress that occurs when bending the first uncoated region 11. Additionally, the gap may prevent damage to the active material layer caused by the clearance when notching or cutting the segments.

The bent direction of the first uncoated region 11 may be, for example, a direction toward the winding center C of the electrode assembly 10. When the first uncoated region 11 has the bent shape as described above, the space occupied by the first uncoated region 11 reduces, thereby improving the energy density. Additionally, the increased coupling area between the first uncoated region 11 and the first current collector 30 may lead to the further improved coupling strength and additional resistance reduction effect.

Although the bend and overlap of the first uncoated region 11 has been described above, it is obvious that the same structure as the first uncoated region 11 may be applied to the second uncoated region 12.

Referring to FIGS. 1 to 4, the battery housing 20 may accommodate the electrode assembly 10 and the first current collector 30. The battery housing 20 is an approximately cylindrical container having an open portion on bottom, and for example, may be made of a material having conductive properties such as a metal. The material of the battery housing 20 may be, for example, aluminum, steel, stainless steel and nickel. The bottom of the battery housing 20 having the open portion is referred to as an open end. The side (the outer circumferential surface) and the upper surface of the battery housing 20 may be integrally formed. The upper surface (a surface parallel to the X-Y plane) of the battery housing 20 has an approximately flat shape. The upper surface disposed on a side opposite to the open portion (or the open end) is referred to as a closed portion. The battery housing 20 accommodates the electrolyte together with the electrode assembly 10 through the open portion formed on bottom.

The battery housing 20 is electrically connected to the electrode assembly 10. For example, the battery housing 20 is electrically connected to the second uncoated region 12 of the electrode assembly 10. In this case, the battery housing 20 has the same polarity as the second uncoated region 12.

Figure 2:
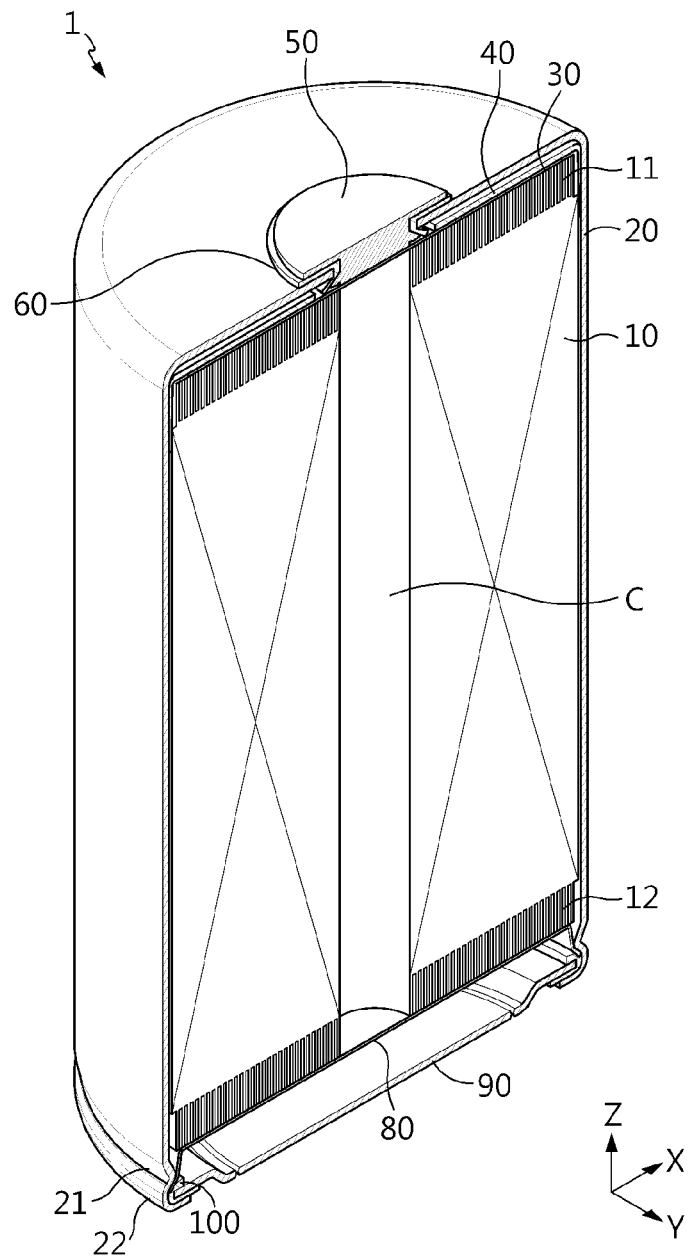
FIG. 2 is a vertical cross-sectional view of the battery of FIG. 1.
Figure 4:
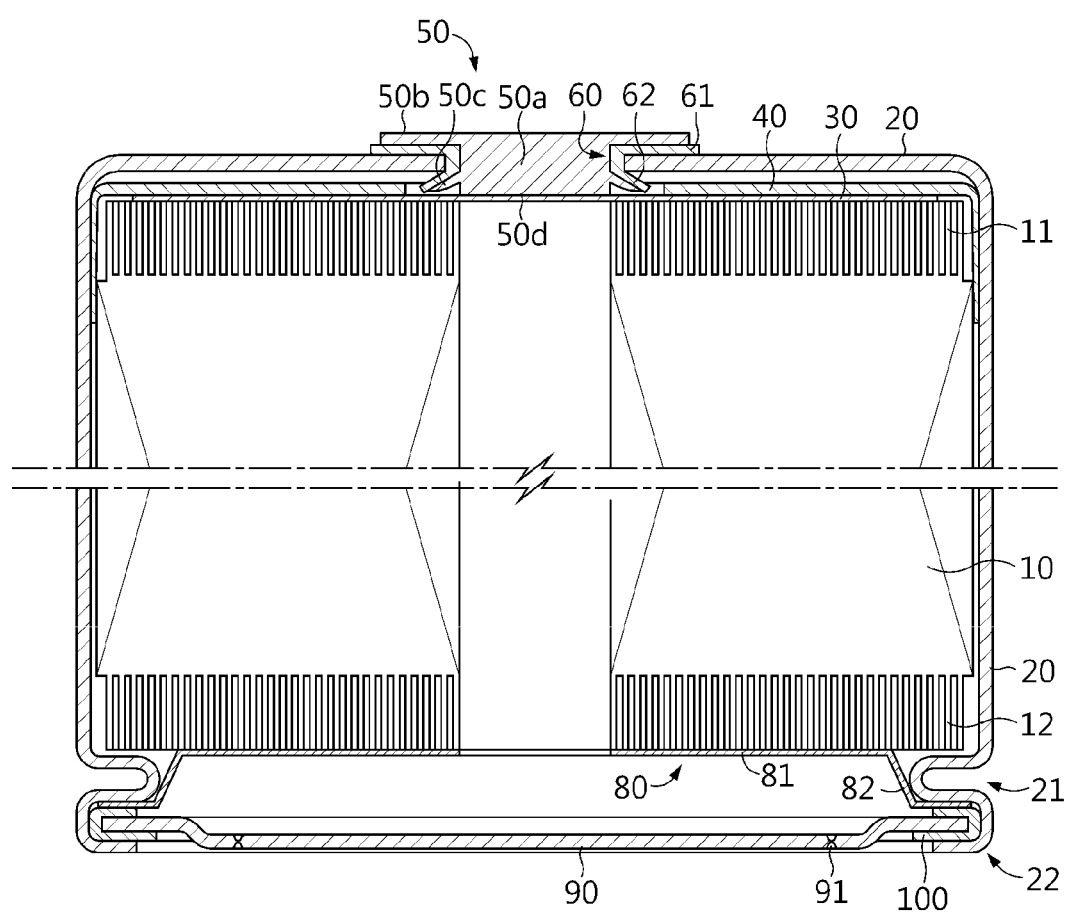
FIG. 4 is a cross-sectional view for describing the inside of the battery of FIG. 1.

Referring to FIGS. 2 and 4, the battery housing 20 may include a beading portion 21 and a crimping portion 22 formed at the lower end. The beading portion 21 is disposed below the electrode assembly 10. The beading portion 21 is formed by press-fitting the periphery of the outer circumferential surface of the battery housing 20. For example, the beading portion 21 may be formed at the end adjacent to the open portion formed on bottom and press-fit inwards. The beading portion 21 may prevent the electrode assembly 10 having a size approximately corresponding to the inner diameter of the battery housing 20 from slipping out of the open portion formed on bottom of the battery housing 20, and act as a support in which the cap 90 is seated.

The crimping portion 22 is formed below the beading portion 21. The crimping portion 22 may be formed on the side facing the open portion rather than the beading portion 21, and may be extended and bent toward the open portion. The crimping portion 22 is extended and bent around the outer circumferential surface of the cap 90 positioned below the beading portion 21 and at least part of the lower surface of the cap 90.

Meanwhile, the present disclosure does not exclude the battery housing 20 not including the beading portion 21 and/or the crimping portion 22. That is, in the present disclosure, when the battery housing 20 does not include the beading portion 21 and/or the crimping portion 22, the fixing of the electrode assembly 10 and/or the sealing of the battery housing 20 may be accomplished, for example, by applying an additional component that may serve as a stopper for the electrode assembly 10. Additionally, when the battery 1 of the present disclosure includes the cap 90, the fixing of the electrode assembly 10 and/or the sealing of the battery housing 20 may be accomplished, for example, by applying an additional structure in which the cap 90 may be seated and/or through welding between the battery housing 20 and the cap 90. For example, the applicant's patent publication KR 10-2019-0030016 A discloses a battery in which the beading portion is omitted, and this structure may be employed in the present disclosure.

Referring to FIGS. 2 to 5A, the first current collector 30 may be coupled on the electrode assembly 10. For example, the first current collector 30 may be coupled to the first uncoated region 11 on the electrode assembly 10. The first current collector 30 may be interposed between the first uncoated region 11 and the insulator 40. For example, the first current collector 30 may be coupled to the first uncoated region 11 on the electrode assembly 10 and interposed between the first uncoated region 11 and the insulator 40. The first current collector 30 may be made of a metal material having conductive properties. Although not shown in the drawing, the first current collector 30 may include a plurality of concave-convex patterns radially formed on the lower surface thereof. When the concave-convex patterns are formed, the concave-convex patterns may be stamped into the first uncoated region 11 by pressing the first current collector 30.

The battery 1 according to another embodiment of the present disclosure may not include the first current collector 30. In this case, the first uncoated region 11 may be directly electrically connected to the terminal 50.

Figure 3:
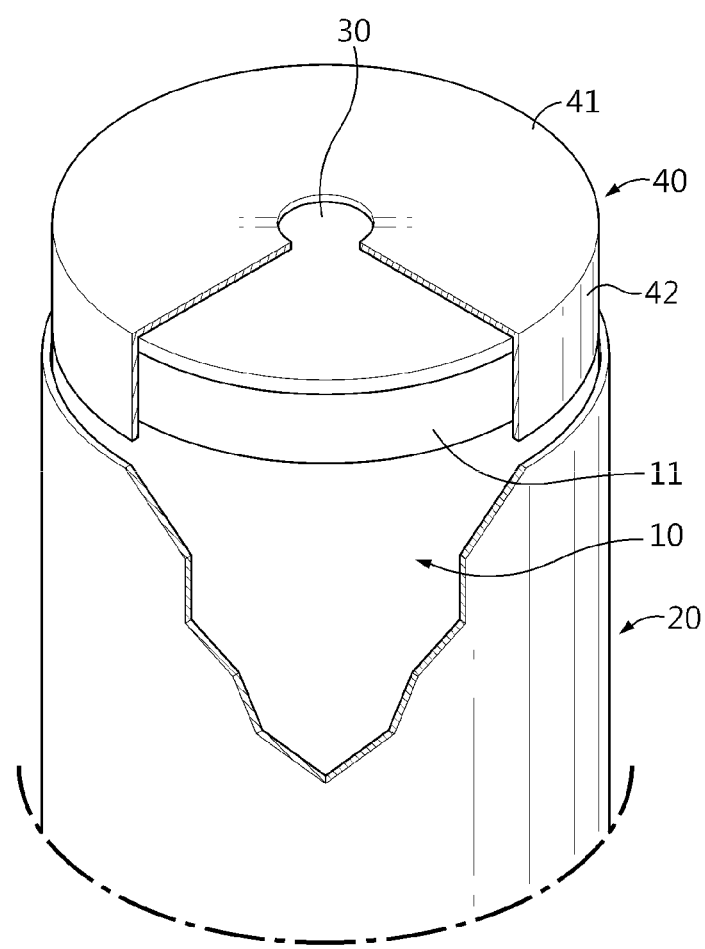
FIG. 3 is a perspective cut-away view showing the inside of the battery of FIG. 1.

Referring to FIGS. 3 and 4, the first current collector 30 may be coupled to the end of the first uncoated region 11. The coupling between the first uncoated region 11 and the first current collector 30 may be accomplished, for example, by laser welding. The laser welding may be performed by partially melting the base material of the first current collector 30, and selectively, may be performed with a solder for welding interposed between the first current collector 30 and the first uncoated region 11. In this case, the solder preferably has a lower melting point than the first current collector 30 and the first uncoated region 11. In addition to the laser welding, resistance welding, ultrasonic welding, spot welding, etc. may be used, but the welding method is not limited thereto.

Referring to FIG. 5B, the first current collector 30 may be coupled onto a coupling surface formed by the end bending of the first uncoated region 11 in a direction parallel to the first current collector 30. The bent direction of the first uncoated region 11 may be, for example, a direction toward the winding center C of the electrode assembly 10. When the first uncoated region 11 has a bent shape as described above, the space occupied by the first uncoated region 11 reduces, resulting in the improved energy density. Additionally, the increased coupling area between the first uncoated region 11 and the first current collector 30 may lead to the coupling strength improvement and resistance reduction effect at the coupling surface.

Referring to FIGS. 2 to 5A, the insulator 40 may be interposed between the inner surface of the battery housing 20 facing the first uncoated region 11 or the first current collector 30 and the first uncoated region 11 or the first current collector 30 to block the electrical connection between the first uncoated region 11 and the battery housing 20. For example, the insulator 40 may be provided between the top of the electrode assembly 10 and the inner surface of the battery housing 20 or between the first current collector 30 coupled on the electrode assembly 10 and the inner surface of the battery housing 20. The insulator 40 prevents the contact between the first uncoated region 11 and the battery housing 20 and/or the contact between the first current collector 30 and the battery housing 20. That is, the insulator 40 is received in the battery housing 20, covers at least part of the electrode assembly 10 and is configured to block the electrical connection between the first uncoated region 11 and the battery housing 20. Accordingly, the insulator 40 may be made of a material having insulation performance. For example, the insulator 40 may include an insulating polymer material.

Referring to FIGS. 2 to 5A, the insulator 40 may include a first cover portion 41 and a second cover portion 42.

The second cover portion 42 may extend downward vertically from the outer periphery of the first cover portion 41. That is, the second cover portion 42 refers to a vertically extended part (parallel to the Z axis) from the outer edge of the first cover portion 41. Accordingly, the first cover portion 41 and the second cover portion 42 may have a shape of a cup. The first cover portion 41 refers to the remaining part of the insulator 40 except the second cover portion 42. For example, in FIGS. 2 to 5A, the first cover portion 41 refers to a horizontally extended part of the insulator 40 (parallel to the X-Y plane). The first cover portion 41 may cover the end of the first uncoated region 11 or the surface of the first current collector 30 facing the inner surface of the battery housing 20. For example, the first cover portion 41 may cover the surface of the first current collector 30 facing the top inner surface of the battery housing 20.

The insulator 40 may have a center hole having a predetermined diameter at the center of the first cover portion 41. For example, the insulator 40 may have the center hole adjacent to the winding center C. For example, the first cover portion 41 may have the approximately circular center hole adjacent to the winding center C. Due to the presence of the center hole, the terminal 50 may come into contact with the first current collector 30 or the first uncoated region 11.

In another aspect of the present disclosure, a plurality of holes having a smaller diameter than the center hole may be further formed around the center hole of the first cover portion 41. For example, the plurality of holes may be formed around the center hole of the first cover portion 41 to allow an electrolyte solution to move. Here, when the electrolyte solution is injected into the battery housing 20, the insulator 40 may be placed on the bottom. That is, when the battery 1 of FIG. 2 is placed upside down, i.e., the terminal 50 is disposed on the lower side, the electrolyte solution may be injected into the battery housing 20.

The electrolyte solution may move down through the center hole provided in the first cover portion 41 of the insulator 40, move in the horizontal direction through the surface of the first cover portion 41, and move up through the plurality of holes. Accordingly, the electrolyte solution may be supplied over the entire electrode assembly 10. That is, when the first cover portion 41 of the insulator 40 has the plurality of holes, the electrolyte solution may be supplied to the electrode assembly 10 smoothly and easily.

Meanwhile, the plurality of holes may be spaced a predetermined distance apart from each other. For example, the plurality of holes may be arranged on any one straight line running from the center of the insulator 40 to the outer circumferential surface of the insulator 40.

The first cover portion 41 may be connected to the second cover portion 42. For example, the first cover portion 41 and the second cover portion 42 may be integrally formed. For example, the first cover portion 41 and the second cover portion 42 may be an integrally formed polymer structure. Alternatively, the first cover portion 41 and the second cover portion 42 may be separately formed and combined or attached together. For example, the first cover portion 41 and the second cover portion 42 may be separately formed and combined into a polymer structure. The materials forming or included in the first cover portion 41 and the second cover portion 42 need not be the same, and can be different materials, for example, when combined or attached to each other.

In this instance, the thickness of the first cover portion 41 may be different from the thickness of the second cover portion 42. Specifically, as can be seen through FIG. 5A, the thickness of the second cover portion 42 may be smaller than the thickness of the first cover portion 41.

In an embodiment of the present disclosure, at least part of the first uncoated region 11 disposed at the outer periphery of the electrode assembly 10 may be omitted. Accordingly, a predetermined space may be formed on top of the outer periphery of the electrode assembly 10 where the first uncoated region 11 is omitted. Accordingly, the electrical contact between the first uncoated region 11 and the battery housing 20 may be prevented by the predetermined space. However, to ensure insulation more reliably, the second cover portion 42 may be provided. In this instance, the thickness of the second cover portion 42 is smaller than the thickness of the first cover portion 41, but it is possible to ensure sufficient insulation performance. Furthermore, as the thickness of the second cover portion 42 is smaller than the thickness of the first cover portion 41, it is possible to minimize the space occupied by the insulator 40.

Figure 5A:
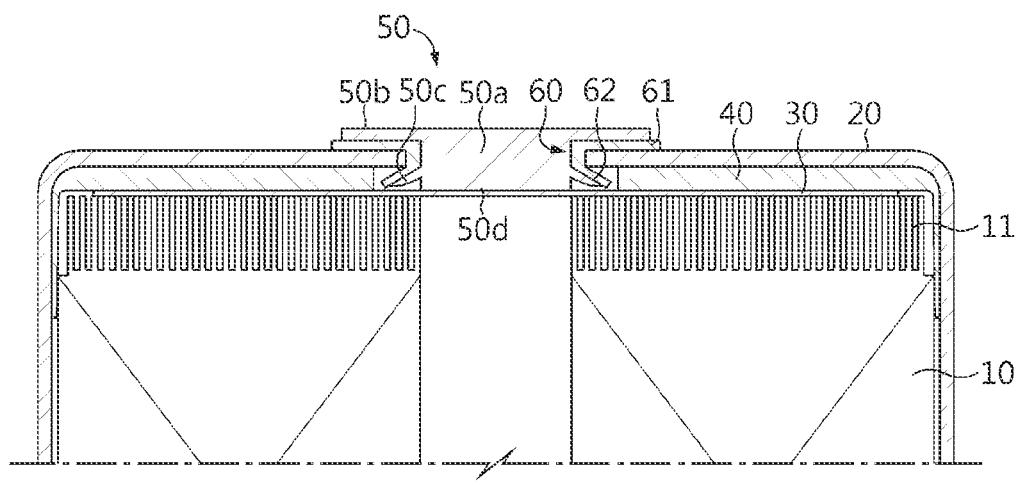
FIG. 5A is a cross-sectional view for describing a battery according to an embodiment of the present disclosure.
Figure 5B:
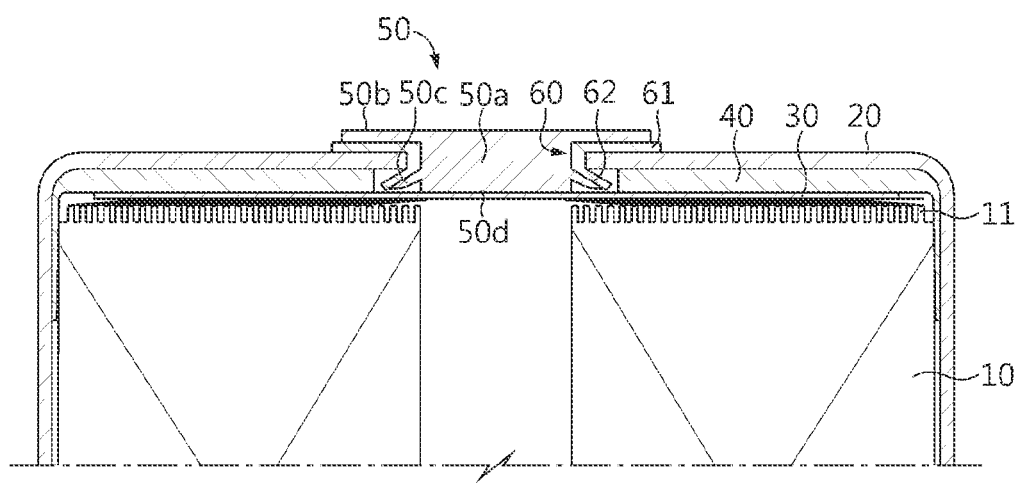
FIGS. 5B to 5E are cross-sectional views for describing a battery according to another embodiment of the present disclosure.

Referring to FIG. 5A, the first cover portion 41 may have a round portion R having a predetermined radius of curvature at the outer periphery of the first cover portion 41. The round portion R may be formed at the intersection between the upper surface of the first cover portion 41 and the side of the second cover portion 42. In this instance, the radius of curvature of the round portion R may be equal to or smaller than the radius of curvature formed at the intersection between the top inner surface of the battery housing 20 and the side of the battery housing 20. With this structure, the round portion R may be come into close contact with the inner surface of the battery housing 20 without a gap. With this structure, it is possible to minimize the movement of the electrode assembly 10 in the battery housing 20, thereby preventing damage to the electrical coupling part, when vibrations and external impacts are applied to the battery 1. However, for example, when the radius of curvature of the round portion R is larger than the radius of curvature formed at the intersection between the top inner surface of the battery housing 20 and the side of the battery housing 20, a space may be formed between the round portion R and the inner surface of the battery housing 20. In this instance, when vibrations and external impacts are applied to the battery 1, movements of the electrode assembly 10 may occur, causing damage to the electrical coupling part.

Meanwhile, the battery 1 of the present disclosure may not include the first current collector 30. In this case, the insulator 40 may include the first cover portion 41 to cover the end of the first uncoated region 11 and the second cover portion 42 to cover the top of the outer circumferential surface of the electrode assembly 10. Although not shown in the drawing, the first cover portion 41 may be disposed in the space between the end of the first uncoated region 11 and the top inner surface of the battery housing 20.

In this instance, the first cover portion 41 of the insulator 40 may have the thickness corresponding to the distance between the end of the first uncoated region 11 and the top inner surface of the battery housing 20. Accordingly, the first cover portion 41 may fill up the space between the end of the first uncoated region 11 and the top inner surface of the battery housing 20 without a gap. Accordingly, it is possible to minimize the movement of the electrode assembly 10 in the battery housing 20, thereby preventing damage to the electrical coupling part, when vibrations and external impacts are applied to the battery 1.

Meanwhile, the insulator 40 may have the thickness that is equal to or larger than about 0.1 mm. When the insulator 40 is too thin, insulation may degrade. In another aspect, it is because forming the insulator 40 to the thickness that is equal to or smaller than a specific thickness may be procedurally difficult to achieve. Meanwhile, the upper limit of the thickness of the insulator 40 may be a thickness corresponding to the distance between the inner surface of the battery housing 20 and the first uncoated region 11 or the distance between the inner surface of the battery housing 20 and the first current collector 30. When the insulator 40 is too thick, the insulator 40 occupies a large area of the inner space of the battery housing 20, resulting in low capacity and high cost of the battery cell. Accordingly, the thickness of the insulator 40 may be set in the appropriate range to maintain proper insulation and prevent the capacity reduction of the battery cell. However, the thickness of the insulator 40 is not limited to the above-described range, and any range of thickness for ensuring insulation and preventing damage to the electrical coupling part by minimizing the movement of the electrode assembly 10 in the battery housing 20 is included in the scope of the present disclosure.

Meanwhile, when the battery 1 of the present disclosure includes the first current collector 30, the insulator 40 may include the first cover portion 41 to cover at least part of the first current collector 30 and the second cover portion 42 to cover the top of the outer circumferential surface of the electrode assembly 10. That is, the first cover portion 41 may cover at least part of the first current collector 30. For example, referring to FIG. 3, the first cover portion 41 may cover all the areas except some areas disposed at the center on the upper surface of the first current collector 30. Additionally, the first cover portion 41 may cover some areas of the first uncoated region 11 uncovered with the first current collector 30.

In this instance, for example, as shown in FIG. 5A, the first cover portion 41 of the insulator may have the thickness corresponding to the distance between the first current collector 30 and the top inner surface of the battery housing 20. Accordingly, the first cover portion 41 may fill up the space between the first current collector 30 and the top inner surface of the battery housing 20 without a gap. Accordingly, it is possible to minimize the movement of the electrode assembly 10 in the battery housing 20, thereby preventing damage from occurring in the electrical coupling part, when vibrations and external impacts are applied to the battery 1.

Figure 5C:
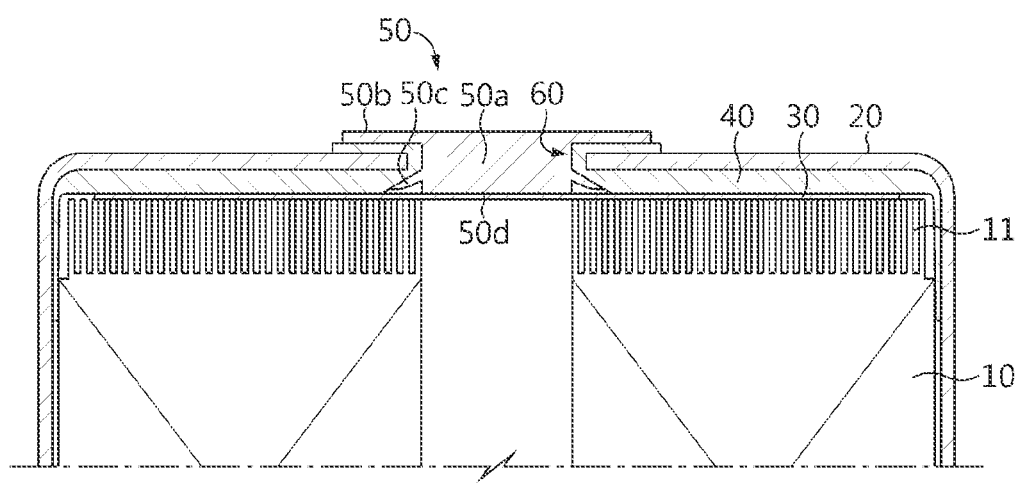
Figure 5D:
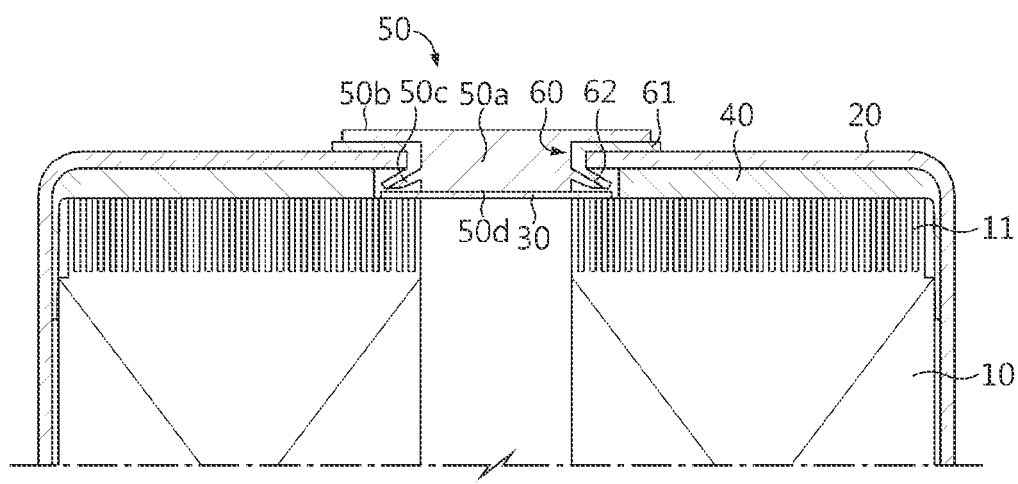
Figure 5E:
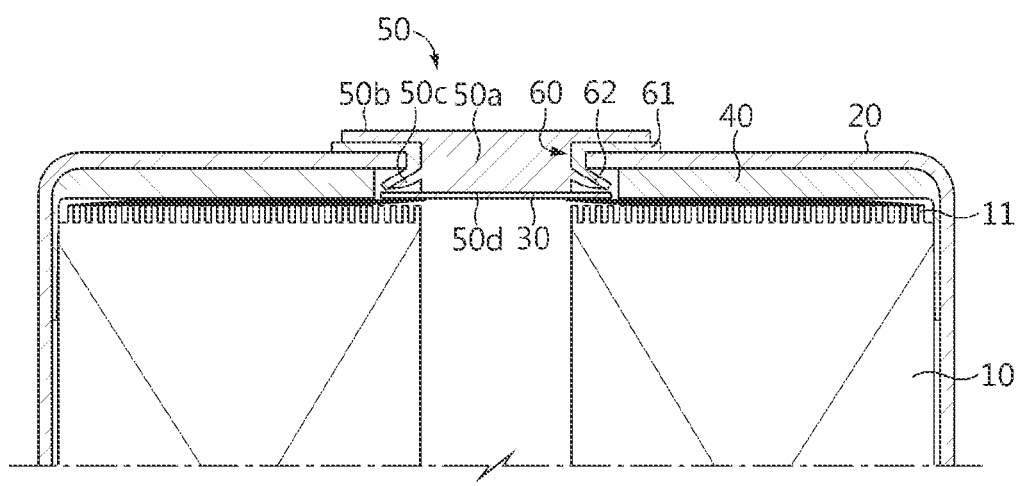

Referring to FIG. 5B or 5E, in another embodiment, at least part of the first uncoated region 11 may be split into the plurality of segments. Here, the plurality of segments may be bent toward the core. Additionally, the plurality of segments may overlap in multiple layers along the radial direction. In this instance, the plurality of segments of the first uncoated region 11 may bend and overlap to form a bent surface. The bent surface may be approximately parallel to the upper surface of the battery housing. In this case, the first cover portion 41 may cover the bent surface formed by the bend of the plurality of segments of the first uncoated region 11. The second cover portion 42 may cover the upper part of the outer circumferential surface of the electrode assembly 10. Referring to FIG. 5E, the area of the first current collector 30 coupled onto the bent surface of the plurality of segments on the electrode assembly 10 and interposed between the bent surface and the battery housing 20 may be much smaller than the area of the upper surface of the electrode assembly 10. For example, the diameter of the first current collector 30 may be equal to or smaller than the diameter of the center hole of the insulator 40. Additionally, the diameter of the first current collector 30 may be larger than the diameter of the winding center hole of the electrode assembly 10. Since the diameter of the first current collector 30 is larger than the diameter of the winding center hole of the electrode assembly 10, the first current collector 30 may be supported on the electrode assembly 10. Meanwhile, the center of the first current collector 30 and the winding center of the electrode assembly 10 may be disposed on the same line. Accordingly, the first current collector 30 and the terminal 50 may be kept in contact with each other for welding them afterwards. Meanwhile, the plurality of segments of the first uncoated region 11 may be bent in an overlapping manner along the radial direction of the electrode assembly 10. Accordingly, the electrode assembly 10 may have the current collection performance at the bent surface by the overlap of the plurality of segments. Furthermore, since at least part of the bent surface is electrically coupled to the first current collector 30, the electrode assembly 10 may be electrically connected to the terminal 50 through the first current collector 30. Meanwhile, as with FIG. 5D, in the embodiment of FIG. 5E, the present disclosure may adopt an embodiment in which only the first uncoated region 11 is not bent.

Referring FIG. 5B or 5E, the first cover portion 41 may have the thickness corresponding to the distance between the bent surface of the plurality of segments and the top inner surface of the battery housing 20. Accordingly, the first cover portion 41 may fill up the space between the bent surface and the top inner surface of the battery housing 20 without a gap. For example, referring to FIG. 5E, the first cover portion 41 may be interposed between the bent surface formed by the bend of the plurality of segments of the first uncoated region 11 facing the top inner surface of the battery housing 20 and the top inner surface of the battery housing 20. Meanwhile, referring to FIG. 5B, the first cover portion may be interposed between the first current collector 30 and the top inner surface of the battery housing 20. In this instance, the first cover portion 41 may have the thickness corresponding to the distance between the first current collector 30 and the top inner surface of the battery housing 20.

Accordingly, it is possible to minimize the movement of the electrode assembly 10 in the battery housing 20, thereby preventing damage to the electrical coupling part, when vibrations and external impacts are applied to the battery 1.

Alternatively, referring to FIG. 5B, in another embodiment of the present disclosure, the area of the first current collector 30 coupled onto the bent surface of the plurality of segments on the electrode assembly 10 and interposed between the bent surface and the battery housing 20 may be approximately similar to the area of the upper surface of the electrode assembly 10. In this instance, the first cover portion 41 may cover the first current collector 30. The first cover portion 41 may have the thickness corresponding to the distance between the first current collector 30 and the top inner surface of the battery housing 20. Accordingly, the first cover portion 41 may fill up the space between the first current collector 30 and the top inner surface of the battery housing 20 without a gap. Accordingly, it is possible to minimize the movement of the electrode assembly 10 in the battery housing 20, thereby preventing damage to the electrical coupling part, when vibrations and external impacts are applied to the battery 1.

The second cover portion 42 may cover the upper part of the outer circumferential surface of the electrode assembly 10. For example, referring to FIGS. 3 and 4, the second cover portion 42 may cover the side of the first uncoated region 11. More specifically, the second cover portion 42 may cover the entire exposed outermost side of the first uncoated region 11 from preventing the first uncoated region 11 from being exposed to the inner circumferential surface of the battery housing 20. Accordingly, it is possible to effectively prevent the electrical contact between the battery housing 20 having the opposite polarity to the first uncoated region 11 and the first uncoated region 11. Accordingly, according to the present disclosure, it is possible to effectively prevent an internal short circuit of the cylindrical secondary battery 1.

More specifically, referring to FIG. 4, the extended length of the second cover portion 42 may be equal to or larger than the extended length of the first uncoated region 11. With this structure, it is possible to prevent the electrical contact between the battery housing 20 having the second polarity and the first uncoated region 11 having the first polarity. Accordingly, the extended length of the second cover portion 42 should be at least equal to the extended length of the first uncoated region 11, and to guarantee reliable insulation, the extended length of the second cover portion 42 is preferably longer than the extended length of the first uncoated region 11 even a little bit. In another embodiment, when the plurality of segments of the first uncoated region 11 bends and overlaps to form a bent surface, the extended length of the second cover portion 42 may be equal to or larger than the length from the lower end point of the cut line between the plurality of segments to the bend location of the plurality of segments. Preferably, the lower end of the second cover portion 42 may be disposed at the lower position than the lower end of the first uncoated region 11. With this structure, the second cover portion 42 may effectively prevent the electrical contact between the side of the first uncoated region 11 and the battery housing 20.

Referring to FIGS. 2 and 4, the terminal 50 may be electrically connected to the first electrode tab 11 of the electrode assembly 10. That is, the terminal 50 may be made of a metal material having conductive properties. The terminal 50 may be electrically connected to the first uncoated region 11, and at least part of the terminal 50 may be exposed through a through-hole formed on top of the battery housing 20. For example, the terminal 50 may pass through approximately the center of the closed portion formed on top of the battery housing 20. That is, the battery housing 20 may have the through-hole at the closed portion provided on top of the battery housing 20. The terminal 50 may be inserted or penetrated into the battery housing 20 through the through-hole. More specifically, a body portion 50*a*, an inner flange portion 50*c* and a flat portion 50*d* of the terminal 50 may be inserted or pass into the battery housing 20 through the through-hole. Accordingly, a part of the terminal 50 may be exposed to the top of the battery housing 20 and the remaining part may be disposed in the battery housing 20. Preferably, the terminal 50 may be riveted through the through-hole. For example, the terminal 50 may be riveted and fixed to the top inner surface of the battery housing 20. Specifically, the inner flange portion 50*c* of the terminal 50 may be fixed onto the inner surface of the closed portion of the battery housing 20, for example, by riveting. The terminal 50 may be coupled to the first current collector 30 or the first uncoated region 11 through the insulator 40. For example, the terminal 50 may be coupled to the first current collector 30 or the first uncoated region 11 through the center hole provided in the insulator 40. In this instance, the diameter of the center hole of the insulator 40 may be equal to or larger than the diameter of the inner flange portion 50*c* as described below. The flat portion 50*d* of the terminal 50 may be electrically coupled to the first current collector 30 through the center hole of the insulator 40. In this case, the terminal 50 may have the first polarity. More preferably, the flat portion 50*d* of the terminal 50 may be coupled to the first current collector 30 by welding. That is, the welding may be performed between the flat portion 50*d* provided inside the inner flange portion 50*c* and the first current collector 30. The flat portion 50*d* may be provided at the lower end of the terminal 50. The flat portion 50*d* and the top inner surface of the battery housing 20 may be parallel to each other. Accordingly, the flat portion 50*d* and the first current collector 30 may be parallel to each other. The welding method may include laser welding. In addition to the laser welding, resistance welding and ultrasonic welding may be used, but the welding method is not limited thereto. With this structure, the terminal 50 may act as a first electrode terminal in the battery 1 of the present disclosure. When the terminal 50 has the first polarity, the terminal 50 is electrically isolated from the battery housing 20 having the second polarity. The electrical insulation between the terminal 50 and the battery housing 20 may be achieved by a variety of methods. For example, insulation may be achieved by interposing the insulation gasket 60 as described below between the terminal 50 and the battery housing 20. Alternatively, insulation may be achieved by forming an insulating coating layer in a part of the terminal 50. Alternatively, the terminal 50 may be structurally firmly secured to prevent the contact between the terminal 50 and the battery housing 20. Alternatively, two or more of the above-described methods may be used together.

Referring to FIG. 4, the terminal 50 includes the body portion 50*a* that is inserted into the through-hole; an outer flange portion 50*b* extended along the outer surface from one side periphery of the body portion 50*a* exposed through the top outer surface of the battery housing 20; the inner flange portion 50*c* extended to the inner surface from the opposite side periphery of the body portion 50*a* exposed through the top inner surface of the battery housing 20; and the flat portion 50*d* provided inside the inner flange portion 50*c*.

The outer flange portion 50*b* is exposed to the outside of the battery housing 20. The outer flange portion 50*b* may be disposed at approximately the center of the upper surface of the battery housing 20. The maximum width of the outer flange portion 50*b* may be larger than the maximum width of the hole formed in the battery housing 20 by the penetration of the terminal 50.

The body portion 50*a* may be inserted into the battery housing 20. The body portion 50*a* may be electrically connected to the first uncoated region 11 through approximately the center of the upper surface of the battery housing 20. More specifically, the body portion 50*a* may be coupled with the first current collector 30 or the first uncoated region 11 through the battery housing 20 and the insulator 40 at the same time. The body portion 50*a* may be rivet-coupled onto the inner surface of the battery housing 20 by the inner flange portion 50*c*. That is, the inner flange portion 50*c* bent toward the inner surface of the battery housing 20 may be provided at the lower peripheral end of the body portion 50*a* by the application of a cocking jig. Accordingly, the maximum width of the body portion 50*a* may be larger than the maximum width of the hole of the battery housing 20 formed by the penetration of the body portion 50*a*. Meanwhile, in another embodiment, the body portion 50*a* may not be bent toward the inner surface of the battery housing 20. That is, the body portion 50*a* may not include the inner flange portion 50*c*. For example, referring to FIG. 6, the body portion 50*a* may have an approximately circular shape passing through the hole disposed at approximately the center of the upper surface of the battery housing 20. In an embodiment of the present disclosure, the body portion 50*a* may have a circular shape on the plane, but is not limited thereto. The body portion 50*a* may have selectively a polygonal shape, a star shape, a shape having a leg extended from the center, etc. The terminal 50, or portions thereof, need not protrude through the top outer surface of the battery housing 20, but may be flush with or coplanar with the top outer surface of the battery housing 20. In some embodiments, the terminal 50, or portions thereof, may be recessed from the top outer surface of the battery housing 20.

Referring to FIGS. 2 to 5A, the insulation gasket 60 is interposed between the battery housing 20 and the terminal 50 to prevent the battery housing 20 and the terminal 50 having the opposite polarities from contacting each other. That is, the insulation gasket 60 blocks the electrical connection between the battery housing 20 and the terminal 50. Accordingly, the upper surface of the battery housing 20 having the approximately flat shape may act as a second electrode terminal of the battery 1.

Referring to FIGS. 2 to 5A, the insulation gasket 60 includes a gasket exposure portion 61 and a gasket insertion portion 62. The gasket exposure portion 61 is interposed between the outer flange portion 50*b* of the terminal 50 and the battery housing 20. The gasket insertion portion 62 is interposed between the body portion 50*a* of the terminal 50 and the battery housing 20. Preferably, the gasket insertion portion 62 is interposed between the inner flange portion 50*c* and the battery housing 20. The gasket insertion portion 62 may come into close contact with the inner surface of the battery housing 20 as the shape of the gasket insertion portion 62 is changed together with the body portion 50*a* during the riveting of the body portion 50*a*. The gasket exposure portion 61 and the gasket insertion portion 62 of the insulation gasket 60 may have different thicknesses for each location.

Meanwhile, the insulation gasket 60 may be made of a resin material having insulating properties. In case that the insulation gasket 60 is made of a resin material, the insulation gasket 60 may be coupled to the battery housing 20 and the terminal 50 by heat fusion. In this case, it is possible to enhance sealability at the coupling interface between the insulation gasket 60 and the terminal 50 and the coupling interface between the insulation gasket 60 and the battery housing 20.

The entire remaining area except the area occupied by the terminal 50 and the insulation gasket 60 on the upper surface of the battery housing 20 corresponds to the second electrode terminal having the opposite polarity to the terminal 50. Alternatively, in the present disclosure, when the insulation gasket 60 is omitted and the insulation coating layer is provided in the terminal 50 in part, the entire remaining area except the area occupied by the terminal 50 having the insulating coating layer on the upper surface of the battery housing 20 may act as the second electrode terminal.

The cylindrical sidewall of the battery housing 20 may be formed as a one piece with the second electrode terminal to prevent discontinuity with the second electrode terminal. The connection from the sidewall of the battery housing 20 to the second electrode terminal may be a smooth curve. However, the present disclosure is not limited thereto, and the connected part may include at least one corner having a predetermined angle.

Figure 6:
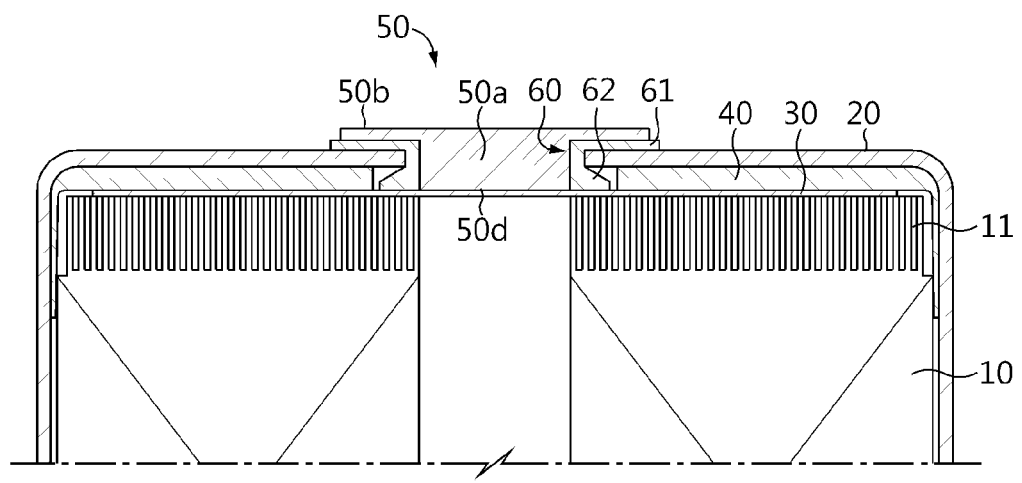
FIGS. 6 and 7 are cross-sectional views for describing a battery according to still another embodiment of the present disclosure.
Figure 7:
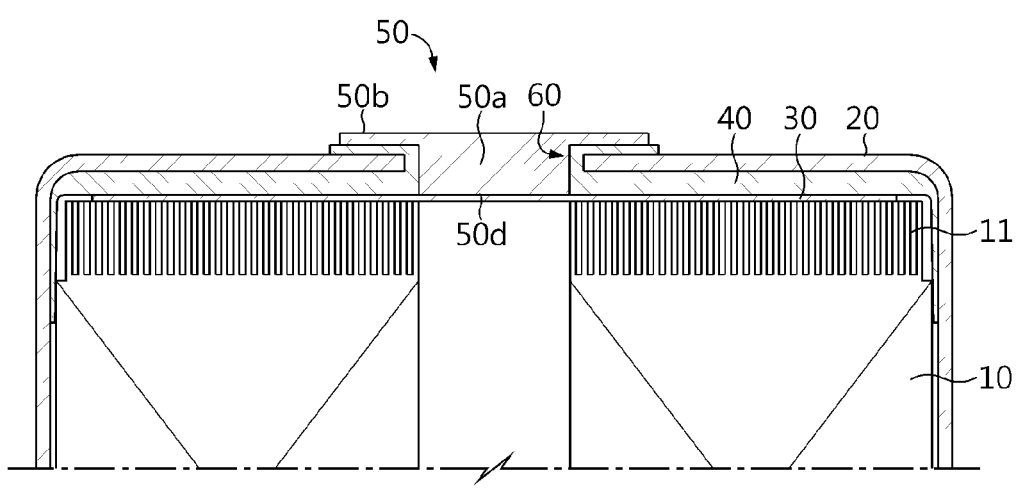

The battery 1 according to the embodiment of FIGS. 6 and 7 is similar to the battery 1 of the previous embodiment of FIG. 5A, and overlapping descriptions of the elements that are substantially identical or similar to the previous embodiment are omitted and difference(s) between this embodiment and the previous embodiment will be described below.

Referring to FIG. 6, the body portion 50a have an approximately circular shape passing through the hole disposed at approximately the center of the upper surface of the battery housing 20. Accordingly, the gasket insertion portion 62 disposed around the body portion 50a may come into close contact with the outer circumferential surface of the body portion 50a. At the same time, the gasket insertion portion 62 may come into close contact with the first current collector 30. With this structure, it may be easy to insert the terminal 50 into the hole of the battery housing 20.

Referring to FIGS. 5C and 7, the insulation gasket 60 and the insulator 40 may be made of the same material. Further, the insulation gasket 60 may be connected to and integrally formed with the insulator 40. The insulation gasket 60 may be made of, for example, a material having the ability to recover its original form. Accordingly, the insulation gasket 60 may be changed into a shape that is easy for coupling when it is inserted into the hole of the battery housing 20, and when the coupling is completed, the insulation gasket 60 may restore to the state of FIGS. 5C and 7. However, this is an example of coupling the insulation gasket 60 to the hole of the battery housing 20, and the coupling method is not limited thereto, and it is obvious that other coupling methods may be employed. With this structure, it is possible to further improve the fixation and the vibration resistance by the insulation gasket 60 and the insulator 40 integrally formed into one.

Figure 8:
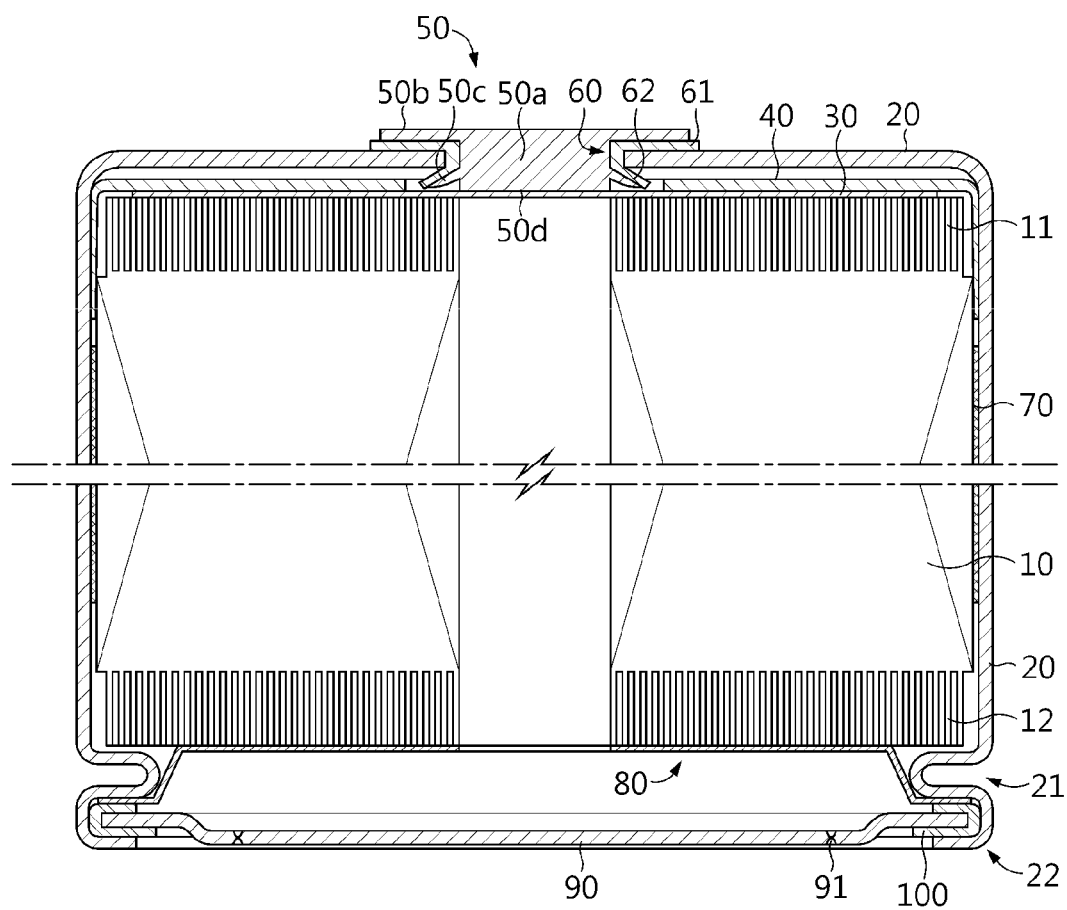
FIGS. 8 and 9 are cross-sectional views for describing a cylindrical secondary battery according to yet another embodiment of the present disclosure.

Referring to FIG. 8, the battery according to an embodiment of the present disclosure may further include a side spacer 70. The side spacer 70 may cover at least part of the outer circumferential surface of the electrode assembly 10. The side spacer 70 may contact at least part of the battery housing 20. For example, the side spacer 70 may contact the inner circumferential surface of the battery housing 20. Preferably, the side spacer 70 may cover at least part of the outer circumferential surface of the electrode assembly 10 along the outer circumference of the electrode assembly 10. That is, the side spacer 70 may be disposed between the outer circumferential surface of the electrode assembly 10 and the inner circumferential surface of the battery housing 20. In this instance, the side spacer 70 may have a thickness corresponding to the distance between the outer circumferential surface of the electrode assembly 10 and the inner circumferential surface of the battery housing 20. For example, describing with reference to FIG. 8, the thickness of the side spacer 70 is approximately equal to the distance between the outer circumferential surface of the electrode assembly 10 and the inner circumferential surface of the battery housing 20. Meanwhile, the thickness of the side spacer 70 may be approximately equal to the thickness of the second cover portion 42 of the insulator 40.

With this structural feature of the side spacer 70, it is possible to fill up the space between the outer circumferential surface of the electrode assembly 10 and the inner circumferential surface of the battery housing 20. Accordingly, it is possible to minimize the movement of the electrode assembly 10 in the battery housing 20, thereby preventing damage to the electrical coupling part, when vibrations and external impacts are applied to the battery 1.

Although not shown in the drawing, the side spacer 70 may be formed with its end in contact with the second cover portion 42 of the insulator 40. Further, the side spacer 70 may be integrally formed with the second cover portion 42. That is, the side spacer 70 may be connected to and integrally formed with the insulator 40. With this structure, it is possible to further reduce the empty space between the outer circumferential surface of the electrode assembly 10 and the inner circumferential surface of the battery housing 20, thereby further improving the vibration resistance. Meanwhile, the side spacer 70 may include an insulating polymer material.

Figure 9:
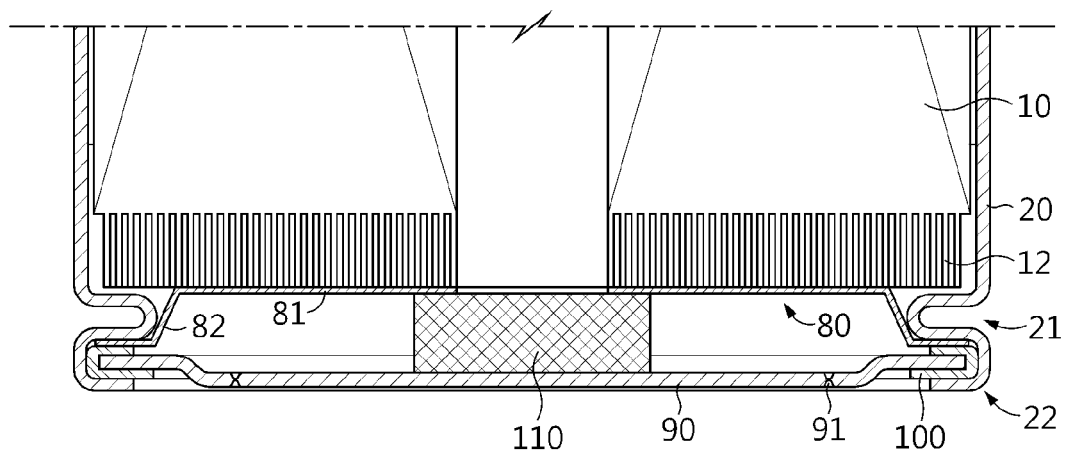

Referring to FIGS. 2, 4 and 9, the second current collector 80 is coupled to the bottom of the electrode assembly 10. The second current collector 80 is made of a metal material having conductive properties and connected to the second uncoated region 12.

Referring to FIG. 4, the second current collector 80 may include at least one tab coupling portion 81 coupled to the second uncoated region 12 and at least one housing coupling portion 82 electrically coupled to the beading portion 21 of the inner surface of the battery housing 20. The housing coupling portion 82 may be compressed and fixed by the crimping portion 22. Preferably, the housing coupling portion 82 may be coupled to the beading portion 21 by welding. The second current collector 80 is electrically connected to the battery housing 20. As shown in FIGS. 4 and 8, the second current collector 80 may be interposed and fixed between the inner surface (the lower surface) of the beading portion 21 of the battery housing 20 and the sealing gasket 100. Alternatively, the second current collector 80 may be welded to the inner surface (the lower surface) of the beading portion 21.

The second current collector 80 may have a leg structure in which the tab coupling portion 81 and the housing coupling portion 82 extend along the radial direction. Preferably, a plurality of leg structures may be provided. The tab coupling portion 81 may be positioned below the electrode assembly 10, and disposed at a higher position than the beading portion 21.

The second current collector 80 has a circular current collector hole at a location corresponding to the winding center hole at the center of the electrode assembly 10. The winding center hole and the current collector hole in communication with each other may serve as a passage for inserting a welding rod for welding between the terminal 50 and the first current collector 30 or irradiation of laser welding beam.

Although not shown in the drawing, the second current collector 80 may have a plurality of concave-convex patterns radially formed on one surface thereof. When the concave-convex patterns are formed, the concave-convex patterns may be stamped into the second uncoated region 12 by pressing the second current collector 80.

Referring to FIG. 9, the second current collector 80 is coupled to the end of the second uncoated region 12. For example, the coupling between the second uncoated region 12 and the second current collector 80 may be accomplished by laser welding. The laser welding may be performed by partially melting the base material of the second current collector 80, and selectively, may be performed with a solder for welding interposed between the second current collector 80 and the second uncoated region 12. In this case, the solder preferably has a lower melting point than the second current collector 80 and the second uncoated region 12. In addition to the laser welding, resistance welding, ultrasonic welding, etc. may be used, but the welding method is not limited thereto.

Although not shown in the drawing, the second current collector 80 may be coupled onto a coupling surface formed by bending the end of the second uncoated region 12 in a direction parallel to the second current collector 80. For example, the bent direction of the second uncoated region 12 may be a direction toward the winding center C of the electrode assembly 10. In the same way as the first uncoated region 11, the second uncoated region 12 may include a plurality of segments to form a bent structure. When the second uncoated region 12 has a bent shape as described above, the space occupied by the second uncoated region 12 reduces, resulting in the improved energy density. Additionally, the increased coupling area between the second uncoated region 12 and the second current collector 80 may lead to the coupling strength improvement and resistance reduction effect at the coupling surface.

Referring to FIGS. 2 and 9, the cap 90 may be made of, for example, a metal material to ensure strength. The cap 90 covers the open portion (the open end) formed on the bottom of the battery housing 20. That is, the cap 90 forms the lower surface of the battery 1. In the battery 1 of the present disclosure, the cap 90 may be non-polar (e.g., has no polarity, such as the first polarity or the second polarity) even when the cap 90 is made of a metal material having conductivity properties. Non-polar may represent that the cap 90 is electrically isolated from the battery housing 20 and the terminal 50. Accordingly, the cap 90 does not act as a positive or negative electrode terminal. Accordingly, the cap 90 does not need to be electrically connected to the electrode assembly 10 and the battery housing 20, and its material is not necessarily a conductive metal.

When the battery housing 20 of the present disclosure includes the beading portion 21, the cap 90 may be seated on the beading portion 21 formed in the battery housing 20. Additionally, when the battery housing 20 of the present disclosure includes the crimping portion 22, the cap 90 is fixed by the crimping portion 22. The sealing gasket 100 may be interposed between the cap 90 and the crimping portion 22 of the battery housing 20 to ensure sealability of the battery housing 20. Meanwhile, as previously described, the battery housing 20 of the present disclosure may not include the beading portion 21 and/or the crimping portion 22, and in this case, the sealing gasket 100 may be interposed between a structure for fixing provided on the opening side of the battery housing 20 and the cap 90 to ensure sealability of the battery housing 20. The cap 90, or portions thereof, need not be flush or coplanar with the crimping portion 22, but may protrude or be recessed relative to an outer end of the crimping portion 22. Referring to FIGS. 2 and 9, the cap 90 may further include a venting portion 91 to prevent the internal pressure from rising above a preset value due to gas generated in the battery housing 20. The venting portion 91 corresponds to an area having a smaller thickness than the other areas in the cap 90. The venting portion 91 is structurally weaker than any other area. Accordingly, when the internal pressure of the battery housing 20 rises above the predetermined level due to faults in the battery 1, the venting portion 91 ruptures to force the gas generated in the battery housing 20 out. For example, the venting portion 91 may be formed by partially reducing the thickness of the battery housing 20 via notching on the upper surface and/or the lower surfaces of the cap 90.

Referring to FIG. 9, the sealing gasket 100 may have an approximately ring shape disposed around the cap 90. The sealing gasket 100 may cover the lower surface, the upper surface and the side of the cap 90 at the same time. The radial length of a region of the sealing gasket 100 that covers the upper surface of the cap 90 may be equal to or smaller than the radial length of a region of the sealing gasket 100 that covers the lower surface of the cap 90. When the radial length of the region of the sealing gasket 100 that covers the upper surface of the cap 90 is too long, there may be a likelihood that the sealing gasket 100 may press the second current collector 80, causing damage to the second current collector 80 or the battery housing 20, in the sizing process of vertically compressing the battery housing 20. Accordingly, it is necessary to maintain a small radial length of the region of the sealing gasket 100 that covers the upper surface of the cap 90 on a predetermined level.

Referring to FIG. 9, the battery 1 according to an embodiment of the present disclosure may further include the lower spacer 110. The lower spacer 110 may be interposed between the cap 90 and the second current collector 80. The lower spacer 110 may be configured to prevent the movement of the electrode assembly 10. For example, as shown in FIG. 9, the lower spacer may have a height corresponding to the distance between the second current collector 80 and the cap 90. Accordingly, the lower spacer 110 fills up the space between the cap 90 and the second current collector 80. Accordingly, it is possible to minimize the movement of the electrode assembly 10 in the battery housing 20, thereby preventing damage to the electrical coupling part, when vibrations and external impact are applied to the battery 1. Meanwhile, the lower spacer 110 may include an insulating polymer material.

Meanwhile, the insulator 40, the insulation gasket 60, the side spacer 70 and the lower spacer 110 of the present disclosure may include, for example, a material having elastic properties. Accordingly, when vibrations and external impacts are applied to the battery 1, the insulator 40, the insulation gasket 60, the side spacer 70 and the lower spacer 110 may absorb the impacts as it is compressed and then restores to the original state by the elastic properties. Accordingly, it is possible to minimize damage of the internal components of the battery 1 when vibrations and external impact are applied to the battery 1.

Preferably, the battery according to the present disclosure may have, for example, a ratio of form factor (a value obtained by dividing the diameter of the battery by its height, i.e., defined as a ratio of diameter Φ to height H) that is larger than approximately 0.4. Here, the form factor refers to a value indicating the diameter and height of the battery.

Preferably, the cylindrical battery may be 40 mm to 50 mm in diameter, and 60 mm to 130 mm in height. The battery according to an embodiment of the present disclosure may be, for example, 46110 cell, 4875 cell, 48110 cell, 4880 cell, 4680 cell. In the value indicating the form factor, the former two numbers indicate the diameter of the cell, and the remaining numbers indicate the height of the cell.

Recently, as batteries are applied to electric vehicles, compared to the existing 1865, 2170 batteries, the form factor of batteries increases. The increased form factor leads to increased energy density, enhanced safety against thermal runaway and improved cooling efficiency.

The energy density of batteries may be further increased by minimizing the unnecessary space inside the battery housing with the increasing form factor. The battery according to the present disclosure has an optimal structure for increasing the capacity of the battery while ensuring electrical insulation between the electrode assembly and the battery housing.

The battery according to an embodiment of the present disclosure may be a battery having an approximately cylindrical shape with the diameter of approximately 46 mm, the height of approximately 110 mm and the ratio of form factor of approximately 0.418.

The battery according to another embodiment may be a battery having an approximately cylindrical shape with the diameter of approximately 48 mm, the height of approximately 75 mm and the ratio of form factor of approximately 0.640.

The battery according to another embodiment may be a battery having an approximately cylindrical shape with the diameter of approximately 48 mm, the height of approximately 110 mm and the ratio of form factor of approximately 0.436.

The battery according to another embodiment may be a battery having an approximately cylindrical shape with the diameter of approximately 48 mm, the height of approximately 80 mm, and the ratio of form factor of approximately 0.600.

The battery according to another embodiment may be a battery having an approximately cylindrical shape with the diameter of approximately 46 mm, the height of approximately 80 mm, and the ratio of form factor of approximately 0.575.

Conventionally, batteries having the ratio of form factor of approximately 0.4 or less have been used. That is, for example, 1865 battery and 2170 battery have been used. In the case of 1865 battery, the diameter is approximately 18 mm, the height is approximately 65 mm, and the ratio of form factor is approximately 0.277. In the case of 2170 battery, the diameter is approximately 21 mm, the height is approximately 70 mm, and the ratio of form factor is approximately 0.300.

The battery according to the above-described embodiment may be used to manufacture a battery pack.

Figure 10:
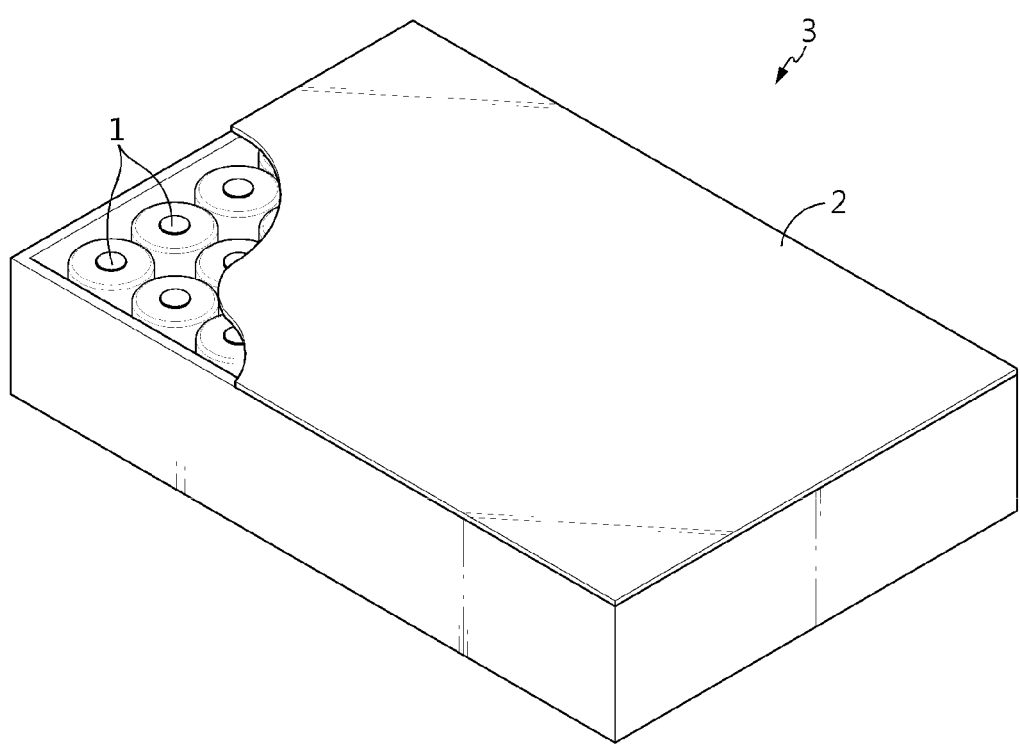
FIG. 10 is a perspective view for describing a battery pack including the battery of FIG. 1 according to an embodiment of the present disclosure.

FIG. 10 is a perspective view schematically showing the configuration of the battery pack according to an embodiment of the present disclosure.

Referring to FIG. 10, the battery pack 3 according to an embodiment of the present disclosure includes an assembly including a plurality of batteries 1 electrically connected to each other and a pack housing 2 in which the assembly is received. The battery 1 is a battery according to the above-described embodiment. For convenience of illustration in the drawings, illustration of some components such as a busbar for electrical connection of the batteries 1, a cooling unit and an external terminal is omitted.

The battery pack 3 may be mounted in a vehicle. The vehicle may be, for example, an electric vehicle, a hybrid electric vehicle or a plugin hybrid electric vehicle. The vehicle includes a four-wheeler or a two-wheeler.

Figure 11:
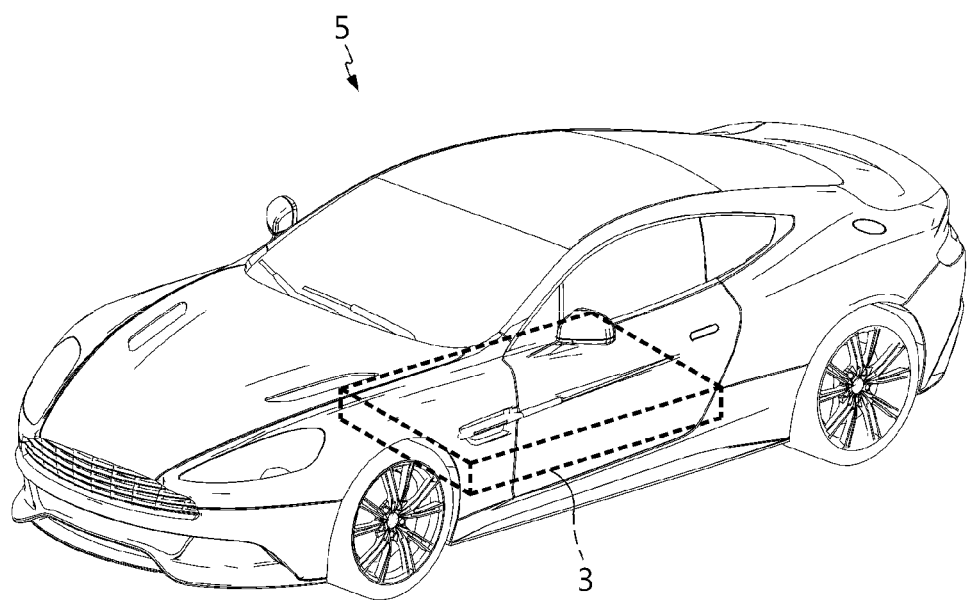
FIG. 11 is a perspective view for describing a vehicle including the battery pack of FIG. 10.

FIG. 11 is a perspective view for describing the vehicle including the battery pack 3 of FIG. 10.

Referring to FIG. 11, the vehicle 5 according to an embodiment of the present disclosure includes the battery pack 3 according to an embodiment of the present disclosure. The vehicle 5 works by the power supplied from the battery pack 3 according to an embodiment of the present disclosure.

While the present disclosure has been hereinabove described with regard to a limited number of embodiments and drawings, the present disclosure is not limited thereto, and it is obvious to those skilled in the art that a variety of modifications and changes may be made thereto within the technical aspects of the present disclosure and the equivalent scope of the appended claims.

DESCRIPTION OF REFERENCE NUMERALS

5: Vehicle
3: Battery pack
2: Pack housing
1: Battery
10: Electrode assembly
C: Winding center
11: First uncoated region
12: Second uncoated region
20: Battery housing
21: Beading portion
22: Crimping portion
30: First current collector
40: Insulator
41: First cover portion
42: Second cover portion
50: Terminal
50a: Body portion
50b: Outer flange portion
50c: Inner flange portion
50d: Flat portion
60: Insulation gasket
61: Gasket exposure portion
62: Gasket insertion portion
70: Side spacer
80: Second current collector
81: Tab coupling portion
82: Housing coupling portion
90: Cap
100: Sealing gasket
110: Lower spacer
R: Round portion

What is claimed is:

1. A battery, comprising:
an electrode assembly including a first electrode, a second electrode and a separator interposed between the first electrode and the second electrode wound around a winding axis, defining a core and an outer circumferential surface, wherein the first electrode includes a first active material region coated with an active material layer along a winding direction and a first uncoated region not coated with the active material layer, and at least part of the first uncoated region itself is used as an electrode tab;

a first current collector coupled to at least part of the first uncoated region on the electrode assembly;

a battery housing to accommodate the electrode assembly and the first current collector;

an insulator interposed between an inner surface of the battery housing facing the first uncoated region or the first current collector and the first uncoated region or the first current collector to block the electrical connection between the first uncoated region and the battery housing: and a terminal electrically connected to the first uncoated region, wherein at least part of the terminal is exposed through a through-hole on top of the battery housing, wherein the insulator includes:

a first cover portion which covers an end of the first uncoated region or a surface of the first current collector facing the inner surface of the battery housing, wherein the insulator has a center hole having a predetermined diameter at a center of the first cover portion, and wherein the terminal includes:

a body portion inserted into the through-hole;

an outer flange portion extended from one side periphery of the body portion exposed through a top outer surface of the battery housing along the outer surface;

an inner flange portion extended from an opposite side periphery of the body portion exposed through a top inner surface of the batter housing toward the inner surface; and a welding portion provided inside the inner flange portion.

2. The battery according to claim 1, wherein the insulator further includes:

a second cover portion which covers an upper part of an outer circumferential surface of the electrode assembly.

3. The battery according to claim 2, wherein the second cover portion is extended downward vertically from an outer periphery of the first cover portion.

4. The battery according to claim 2, wherein the first current collector is coupled to the first uncoated region on the electrode assembly and interposed between the first uncoated region and the insulator.

5. The battery according to claim 4, wherein the first cover portion covers a surface of the first current collector facing a top inner surface of the battery housing.

6. The battery according to claim 4, wherein the first cover portion has a thickness corresponding to a distance between the first current collector and a top inner surface of the battery housing.

7. The battery according to claim 1, wherein at least part of the first uncoated region is split into a plurality of segments along the winding direction of the electrode assembly.

8. The battery according to claim 7, wherein the plurality of segments is bent along a radial direction of the electrode assembly.

9. The battery according to claim 7, wherein the plurality of segments overlaps in multiple layers along a radial direction of the electrode assembly.

10. The battery according to claim 2, wherein the second cover portion covers an entire exposed outermost side of the first uncoated region to prevent the first uncoated region from being exposed toward an inner circumferential surface of the battery housing.

11. The battery according to claim 2, wherein an extended length of the second cover portion is equal to or larger than an extended length of the first uncoated region.

12. The battery according to claim 8, wherein an extended length of the second cover portion is equal to or larger than a length from a lower end point of a cut line between the plurality of segments to a bend location of the plurality of segments.

13. The battery according to claim 3, wherein a lower end of the second cover portion is disposed at a lower position than a lower end of the first uncoated region.

14. The battery according to claim 1, wherein a center of the first current collector and a winding center of the electrode assembly are disposed on a same line.

15. The battery according to claim 14, wherein a diameter of the first current collector is equal to or smaller than the predetermined diameter of the center hole of the insulator.

16. The battery according to claim 14, wherein the diameter of the first current collector is larger than a diameter of a winding center hole at the winding center of the electrode assembly.

17. The battery according to claim 1, wherein the diameter of the center hole of the insulator is equal to or larger than a diameter of the body portion.

18. The battery according to claim 1, wherein the diameter of the center hole of the insulator is equal to or larger than a diameter of the inner flange portion.

19. The battery according to claim 1, wherein the body portion of the terminal passes through the center hole of the insulator.

20. The battery according to claim 1, wherein the welding portion of the terminal is electrically coupled to the first current collector through the center hole of the insulator.

21. The battery according to claim 20, wherein the welding portion of the terminal is coupled to the first current collector by welding.

22. The battery according to claim 1, further comprising:

an insulation gasket interposed between the battery housing and the terminal to block the electrical connection between the battery housing and the terminal, and, optionally, the insulation gasket is connected to and integrally formed with the insulator.

23. The battery according to claim 1, further comprising:

a side spacer which covers at least part of an outer circumferential surface of the electrode assembly and contacts an inner circumferential surface of the battery housing, and, optionally, the side spacer covers at least part of an outer circumferential surface of the electrode assembly along an outer periphery of the electrode assembly.

24. The battery according to claim 1, wherein the first cover portion includes a round portion having a predetermined radius of curvature at an outer periphery of the first cover portion.

25. The battery according to claim 24, wherein the round portion is formed at an intersection between an upper surface of the first cover portion and a side of the second cover portion.

26. The battery according to claim 24, wherein the radius of curvature of the round portion is equal to or smaller than a radius of curvature formed at the intersection between the top inner surface of the battery housing and the side of the battery housing.

27. The battery according to claim 26, wherein the round portion comes into close contact with the inner surface of the battery housing without a gap.

28. The battery according to claim 1, wherein a plurality of holes having a smaller diameter than the center hole is further formed around the center hole of the first cover portion.

\* \* \* \* \*